United States Patent
Sekiguchi et al.

(10) Patent No.: US 7,178,922 B2
(45) Date of Patent: Feb. 20, 2007

(54) LAMP, CONDENSING OPTICAL SYSTEM, AND IMAGE DISPLAY DEVICE

(75) Inventors: Akira Sekiguchi, Tokyo (JP); Tomohiro Sasagawa, Tokyo (JP); Yoshiyuki Goto, Tokyo (JP); Kohei Teramoto, Tokyo (JP); Tetsuo Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/176,286

(22) Filed: Jul. 8, 2005

(65) Prior Publication Data

US 2005/0243572 A1 Nov. 3, 2005

Related U.S. Application Data

(62) Division of application No. 10/677,473, filed on Oct. 3, 2003, now abandoned.

(51) Int. Cl.
*G03B 21/20* (2006.01)
*G02F 1/13357* (2006.01)
*F21V 7/09* (2006.01)

(52) U.S. Cl. .......... 353/102; 353/97; 349/62; 362/308; 362/296

(58) Field of Classification Search ........... 353/85–87, 353/97, 98, 102, 20, 29, 30, 31, 37; 349/5, 349/61–63, 67; 362/550, 561, 296–300, 362/307–311, 327–329
See application file for complete search history.

(56) References Cited

U.S. PATENT DOCUMENTS

| | | | |
|---|---|---|---|
| 4,457,600 A | 7/1984 | Hall | |
| 4,642,740 A | 2/1987 | True | |
| 5,755,503 A * | 5/1998 | Chen et al. | 353/38 |
| 5,884,991 A | 3/1999 | Levis et al. | |
| 5,966,250 A | 10/1999 | Shimizu | |
| 6,205,271 B1 | 3/2001 | Bowron et al. | |
| 6,231,193 B1 | 5/2001 | Sugawara | |
| 6,464,362 B1 | 10/2002 | Sugawara et al. | |
| 6,997,565 B2 * | 2/2006 | Sekiguchi et al. | 353/102 |
| 2002/0048172 A1 | 4/2002 | Wada et al. | |
| 2002/0075460 A1 | 6/2002 | Kappel et al. | |
| 2003/0063261 A1 | 4/2003 | Li | |
| 2003/0210482 A1* | 11/2003 | Arnold | 359/853 |
| 2003/0214617 A1 | 11/2003 | Bierhuizen et al. | |
| 2004/0021827 A1 | 2/2004 | Sekiguchi et al. | |
| 2004/0070841 A1* | 4/2004 | Bierhuizen | 359/641 |

FOREIGN PATENT DOCUMENTS

| | | |
|---|---|---|
| JP | 7-174974 | 7/1995 |
| JP | 2002-214563 | 7/2002 |
| JP | 2004-139087 A * | 5/2004 |

* cited by examiner

*Primary Examiner*—W. B. Perkey
*Assistant Examiner*—Andrew Sever
(74) *Attorney, Agent, or Firm*—Leydig, Voit & Mayer, Ltd.

(57) ABSTRACT

A lamp has a deformed lamp reflector and a lamp front glass. The deformed lamp reflector is made by deforming an ellipsoid of revolution of a conventional lamp reflector into an aspherical reflection surface rotationally symmetrical with respect to an optical axis. The lamp front glass is obtained by deforming at least one of an incident surface and outgoing surface of a conventional lamp front glass into an aspherical lens surface rotationally symmetrical with respect to the optical axis. A light flux emitted from the center point of an illuminant is reflected by the deformed lamp reflector, and output with a uniform density through all of the outgoing surface of the lamp front lens so that the light flux is condensed at focus point.

8 Claims, 18 Drawing Sheets

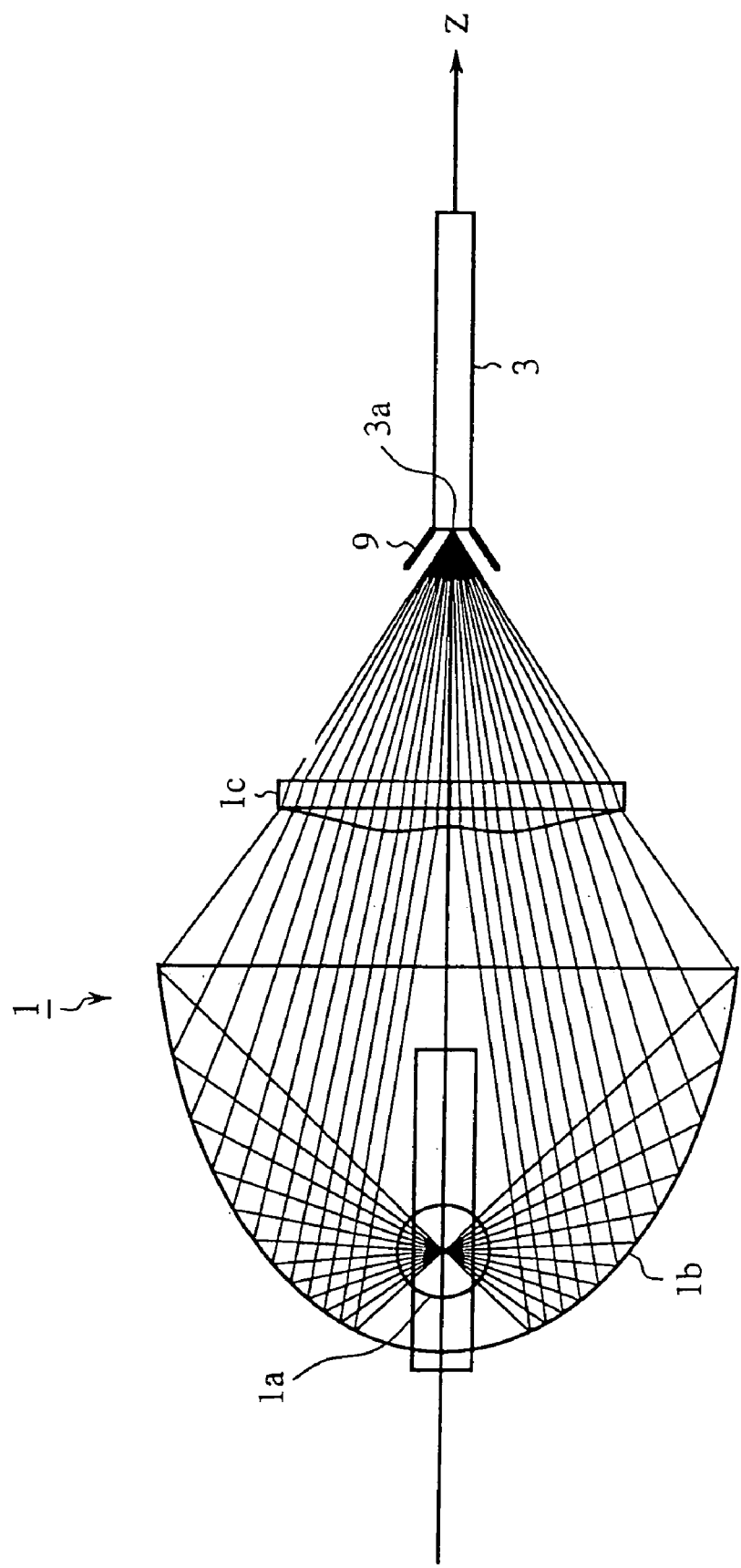

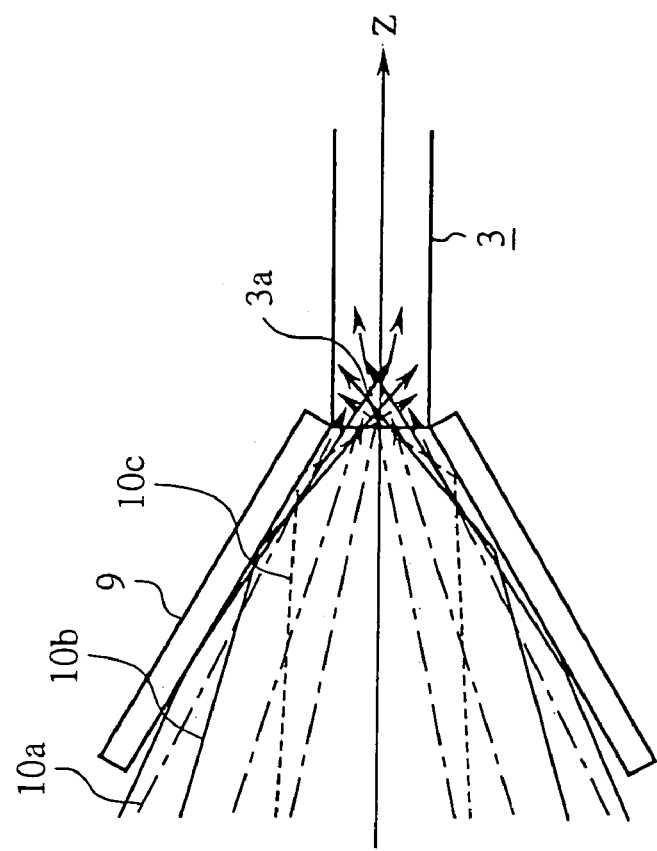
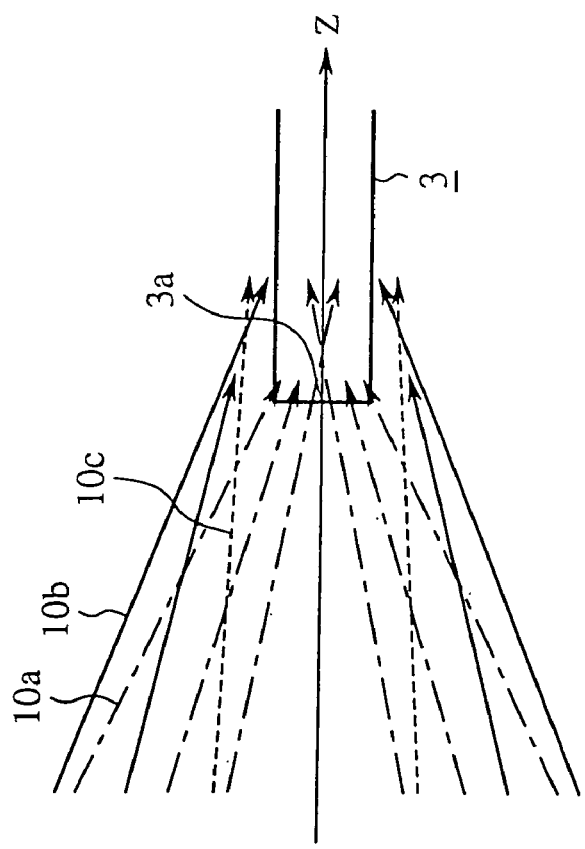
FIG.19A
FIG.19B

LAMP, CONDENSING OPTICAL SYSTEM, AND IMAGE DISPLAY DEVICE

BACKGROUND OF THE INVENTION

1. Field of the Invention

The present invention relates to a lamp having an illuminant section, for reflecting and condensing light emitted from an illuminant within the range of a radiation angle, and relates to a condensing optical system and an image display device which use the lamp.

2. Description of the Related Art

FIG. 1 is a diagram showing a configuration of a condensing optical system using a conventional lamp and showing a sectional view of the condensing optical system which has been cut by a plane including the optical axis of the optical system.

In FIG. 1, reference number 101 designates the conventional lamp, 101a denotes an illuminant, 101b indicates a lamp reflector, and 101c designates a lamp front glass.

The conventional lamp 101 is made up of the illuminant 101a, the lamp reflector 101b, and the lamp front glass 101c.

The illuminant 101a has a glass bulb and electrodes placed at the center of the bulb. The light is generated in and emitted from a space between the electrodes. The space between the electrodes is a light source of the illuminant 101a.

The lamp reflector 101b is a reflecting mirror formed on an ellipsoid of revolution, in which the illuminant 101a is located at one of two foci of the ellipsoid of revolution (hereinafter referred to as "parabolic focus") and at the center position between the electrodes. The ellipsoid of revolution reflects the light emitted from the illuminant 101a.

The ellipsoid of revolution means a space curved surface obtained by rotating a part of the ellipsoidal around its rotation major axis (or optical axis)

When light emitted from one of the foci of the ellipsoidal surface on the optical axis is reflected by the ellipsoid of revolution, it is well known that all of the reflected light is condensed into the other focus of the ellipsoidal. That is, the two of the ellipsoidal are conjugate points.

The use of this principle can make the lamp have a condenser function. When compared with the lamp using the paraboloid of revolution generating parallel light, the lamp 101 can be constructed with a small number of components because the ellipsoid of revolution condenses light and it thereby does not require any condenser lens for condensing parallel light into the lens focus.

Based on the above reasons, in the lamp 101 the illuminant 101a is an approximate point light source, and the center point of the electrodes of the illuminant 101a is coincided with one focus of the ellipsoid of revolution of the lamp reflector 101b, and the lights emitted from the illuminant 101a are reflected by the lamp reflector 101b and then condensed into the other focus of the ellipsoid of revolution.

The lamp front glass 101c is so placed that it covers an aperture of the lamp reflector 101b. This prevents the occurrence of a rarely accident caused by explosion of the illuminant 101a, so that the lamp front glass 101c can prevent to spread the damage of the explosion to other optical elements.

The lights, of course, reflected by the lamp reflector 101b are radiated to external section of the lamp 101 through the lamp front glass 101c. In the conventional lamp 101, it is so designed that the incident plane (or incoming plane) and the outgoing plane of the lamp front glass 101c are planes which go straight to the optical axis Z, so that the incident plane and the outgoing plate of the lamp front glass 101c refract the lights from the lamp reflector 101b and condense the lights into the focus on the optical axis apart from the other focus of the ellipsoid of revolution.

Reference 103 designates a column-shaped glass called "a rod integrator" having a configuration in which the light is input through its incident plane and transmitted through the inside of the rod integrator and output through its outgoing plane. In order to increase the light receiving efficiency at the incident plane and to suppress a loss as low as possible by increasing the amount of the incident light as large as possible, the incident plane of the rod integrator 103 is placed at the condenser point of the light passed through the lamp front glass 10c.

The line Z through which the center of the illuminant 101a and the center of the incident plane of the rod integrator 103 are connected is a common optical axis. The positive direction (or forward direction) of the optical axis Z is a forward direction of the light. The space near the optical axis Z indicated by reference character D is a dead zone where there is no light flux. The conventional condensing optical system comprises the lamp 101, the condenser lenses 102a and 102b, and the rod integrator 103.

Before the explanation of the operation of the condensing optical system shown in FIG. 1, a description will now be given of the explanation of a brilliance distribution characteristic and an orientation distribution characteristic of the illuminant 101a.

FIG. 2 is a diagram showing a typical brilliance distribution characteristic of the illuminant 101a. For example, the illuminant 101a such as a metal halide lamp and a high pressure mercury lamp has the brilliance distribution characteristic shown in FIG. 2.

In FIG. 2, reference characters 101d and 101e denote the electrodes of the illuminant 101a, Pd and Pe indicate emitting front points closed to the electrodes 101d and 101e, and Pf designates the center point of the emitting front points Pd and Pe.

As previously explained, the center point Pf is equal in position to the ellipsoidal focus of the lamp reflector 101b. Reference number 104 designates the brilliance distribution of the illuminant 101a shown in contour lines. The brilliance distribution 104 is shown using the relatively brilliance values 10–90 every 10.

The distance d shown in FIG. 2 is called an arc length that is one of indexes of the performance of the lamp 101. That is, the arc length d is an approximation parameter indicating the degree of the similarity between the actual illuminant 101a and an ideal point light source.

When the magnitude of the arc length d is smaller as low as possible, the front points Pd and Pe of the electrodes 101d and 101e become closer to the center point Pf, so that the illuminant 101a becomes closer to the ideal point light source.

Thus, the illuminant 101a has the illuminant of a finite size defined by the arc length d. When AC or DC voltage is applied to the electrodes 101d and 101e, the light is emitted from the space between the electrodes 101d and 101e according to the brilliance distribution 104. As can be understood from FIG. 2, the maximum brilliance of a relative brilliance value of approximately 90 is obtained at the front points Pd and Pe of the electrode 101d and 101e. The relative brilliance value 50–60, which is slightly smaller than the maximum brilliance value, is obtained at the center point Pf. The relative brilliance value is gradually decreased to the value 10 according to increasing of the distance from the front points Pd and Pe.

Thus, the point where the maximum brilliance value is obtained is the front point Pd or Pe which is shifted from the center point Pf by half of the arc length d. That is, the brilliance value obtained at the center point Pf, namely at the ellipsoidal surface focus of the lamp reflector 101b is not the maximum brilliance value.

FIG. 3 is a diagram showing the orientation distribution characteristic of the illuminant 101a, where reference number 105 indicates an orientation distribution. In FIG. 3, the center point Pf of the illuminant 101a is the orientation O, and the forward direction of the optical axis Z is defined as the radiation angle of zero, and the clockwise direction on a sheet is the direction from zero to 360 degrees. In FIG. 3, a luminous intensity is indicated every 20 degrees from zero to 100 around the origin O in direction of a constant radiation angle. In this case, for example, a point farther from the origin O has a higher luminous intensity and the luminous intensity of the origin O is zero. When the luminous intensity is measured on an optional plane including the optical axis z shown in FIG. 1, the orientation distribution shown in FIG. 3 is obtained.

The orientation distribution 105 shows the higher luminous intensity of not less than 80 at two ranges of the radiation angles 60–120 and 240–300. On the other hand, the orientation distribution 105 shows the lower intensity of light at two ranges of angles of approximately ±50 around the radiation angle zero and around the radiation angle 180. This means that the electrodes 101a and 101b are placed in the illuminant 101a, and the light is cut by shadows of the electrodes 101d and 101e at approximately ±50 around zero and around 180, as shown in FIG. 2.

A description will be given of the operation of the condensing optical system shown in FIG. 1.

The greater part of light emitted from the illuminant 101a is reflected by the lamp reflector 101b. As shown in FIG. 2, because the illuminant 101a has the luminous of a finite size designated by the arc length d, the reflected lights from the lamp reflector 101b become an imperfect light flux to be transmitted to the other focus point of the ellipsoidal. This light flux goes toward the forward direction of the optical axis Z through the lamp front glass 101c. As has been previously described regarding the orientation distribution characteristic shown in FIG. 3, the dead zone D is present where there is no light because of the shadow of the electrodes 101d and 101e.

The light flux from the lamp 101 is condensed to the lens focus on the optical axis Z after refracting it by the incident plane and the outgoing plane of the lamp front lens 101c. The condensed light flux is then input into the incident plane of the rod integrator 103, and transmitted through the inside of the rod integrator 103, as shown in following FIG. 4.

FIG. 4 is a diagram showing an optical path of the transmitted light through the inside of the rod integrator 103. In FIG. 4, reference characters 103a, 103b, and 103c designate the incident plane, the side surface, and the outgoing plane of the rod integrator 103, respectively. Both the incident plane 103a and the outgoing plane 103b are perpendicularly intersected to the optical axis Z.

The lamp front glass 101c is so designed that the incident lights input into the incident plane 103a are transmitted while performing the total reflection at the side surface 103b of the rod integrator 103. Therefore, the incident lights through the incident plane 103a are totally reflected repeatedly at the side surface 103b and finally output through the outgoing plane 103c. Because the rod integrator 103 uses the phenomenon of the total reflection, there is no leaking of light through the side surface 103b and no loss in the rod integrator 103.

At this time, because the lights from the lamp front glass 101c are input into the incident plane 103a at various incident angles, an illumination distribution of the lights after performing the total reflection repeatedly at the side surface 103b becomes approximately uniform at the outgoing plane 103c.

FIG. 5A and FIG. 5B are diagrams showing the illumination distribution characteristic of the incident light and the outgoing light of the rod integrator 103. In FIGS. 5A and 5B, an axis parallel to the optical axis Z shows the illumination of the incident light and the outgoing light.

The rod integrator 103 has the function to convert the incident light having the illumination distribution like Gauss distribution (see FIG. 5A) into the outgoing light having a uniform illumination distribution (see FIG. 5B).

The lights of the uniform illumination distribution made by the rod integrator 103 are transferred by the following optical system. For example, in cases of an image display device using an optical modulation element such as a DMD chip (Digital Micro mirror Device which is a trade mark of Texas Instrument Incorporated (TI)) or a crystal liquid panel, the outgoing lights from the rod integrator 103 are irradiated to the optical modulation element through a relay optical system in order to obtain image information. The lights with the image information are projected onto a screen through a projecting optical system, so that the image based on the image information is displayed on the screen.

Because of the configuration described above, the conventional lamp involves a drawback to increase the divergent angle of the outgoing light flux after the lamp reflector reflects the lights from the illuminant.

Further, because of the configuration described above, the conventional condensing optical system involves a drawback to spread the illuminant image at the focus point of the lamp front glass and thereby to cause a leaking loss of the incident lights at the incident plane of the rod integrator.

Furthermore, because of the configuration described above, the conventional image display device described above involves a drawback to decreases the brightness of the image to be projected on the screen by the leaking loss generated at the incident plane of the rod integrator.

A description will now be given of the explanation for each of the above conventional drawbacks.

In FIG. 1, when the illuminant 101a is an ideal point light source in geometry, lights emitted from the illuminant 101a are transmitted to the other focus of the ellipsoidal by the reflection of the lamp reflector 101b. Thus, because all of the lights are condensing to the condensing point at the lamp reflector 101b and then transmitted into the incident plane 103a of the rod integrator 103, there is no leaking loss of the lights caused at the incident plane 103a excepting a reflection loss in the lamp reflector 101b and the like.

However, as has been explained using FIG. 2, because the illuminant 101a has a light source of a finite size defined by the arc length d, it is not the ideal point light source. Accordingly, the illuminant image having a finites size is generated at the incident plane of the rod integrator 103 because the light distribution at the incident plane 103a of the rod integrator 103 is not condensed into the condensing point.

FIG. 6 is a diagram showing the explanation for the image of the illuminant 101a appeared at the incident plane 103a of the rod integrator 103.

In FIG. 6, the center point Pf is selected as a reference point. This center point Pf is equal to the front points Pd and Pe having the maximum brilliance and the one focus of the ellipsoidal shown in FIG. 2. FIG. 6 shows the state to condense the lights 106d and 106e, and 106f transmitted from those points Pd, Pe, and Pf into the incident plane 103a.

In this case, we will pay an attention to both the point 101z on the outgoing plane of the lamp front glass 101c and the lights passing through this point 101z.

Accordingly, the light 106f is input into the incident plane 103a based on the design without any leaking of the incident lights.

On the other hand, because the points Pd and Pe at which the lights are generated are not on the other focus of the ellipsoidal, the lights 106d and 106e passing through the point 101z in the light flux from the front points Pd and Pe are not condensed into the other focus of the ellipsoidal after the reflection by the lamp reflector 101b. That is, the lights emitted from the point 101z in the lamp front glass 101 are not transmitted into the condensing point.

In this case, when the lamp front glass 101c is recognized as a virtual plane light source, it is defined that this light source generates lights having the maximum divergent angle at the point 101z around the light 106f as the center, such as the lights 106d and 106e.

Because the inclined lights 106d and 106e have an angle which is out of the design, when the lights are condensed into the incident plane 103a by the lamp front glass 10c, many of the lights are out of the sectional area of the incident plane 103a.

In this case, the lights generated at each point between the electrodes 101d and 101e around the center point Pf do not become the complete point at the condensing point after transmitting through the lamp front lens 10c. This forms an illuminant image whose size is larger in area than the sectional area of the incident plane 103a.

FIG. 7 is a diagram showing the result of quantitative analysis of the receiving of the lights 106d, 106e, and 106f at the incident plane 103a. FIG. 7 is a diagram showing the relationship between the outgoing position of the outgoing light from the lamp front glass 101c and the incident position of the incident light to the incident plane 103a.

In FIG. 7, the horizontal axis represents the position through which the light is output from the lamp front glass 10c, which has a distance R measured from the optical axis Z show in FIG. 6. The vertical axis designates the position through which the light is input into the incident plane 103a, which has a distance Ri measured from the optical axis Z shown in FIG. 6.

In this analysis, the lamp 101 has the arc length d=1.1 [mm], the aperture diameter 40 [mm] of the lamp reflector 101b, and the sectional area 3.8×5.5 [mm²] of the incident plane 103a. The lamp front lens 101c focus the light to the incident plane 103a with F value=1.

The line Ri=±1.9 [mm] indicated by the reference characters 107a and 107b shown in FIG. 7 represents the boundary of the incident plane 103a and the region |Ri|≦1.9 [mm] corresponds to the size of the incident plane 103a.

Because the incident position of the light 106f to the total outgoing range of R=0–11 [mm] becomes |Ri|<approximately 0 [mm], it is understood that the light 106f is always input into the incident plane 103a.

In addition, the lights 106d and 106e are in the boundary 107a–107b of the incident plane 103a within the outgoing range of R=approximately 7–11 [mm] which is greatly apart from the output axis Z. Therefore no leaking of the input light occurs within the outgoing range, and there occurs no loss of the leaking light.

On the contrary, the lights 106d and 106e are out of the boundary 107a–107b in the outgoing range relatively close to the optical axis Z of not more than R=approximately 7 [mm]. That is, the loss Ld of the light 106d occurs within the outgoing range of R=approximately 0–4.5 [mm], and the loss Le of the light 106e occurs within the outgoing range of R=approximately 2–7 [mm].

This case includes a serious problem that the luminous intensity in the losses Ld and Le are greater than that in other areas. The reason will now be explained with reference to FIG. 8. FIG. 8 is a diagram showing the luminous intensity distribution of the outgoing light from the lamp front glass 101c. Similar to the case shown in FIG. 7, the horizontal axis indicates the distance R measured from the optical axis and the vertical axis represents the relative luminous intensity (Illumination×a very short ring-shaped area) of the outgoing light.

As clearly understood from FIG. 8, for example, the range of the outgoing light having the relative luminous intensity of approximately not less than approximately 0.1 is R=approximately 4–7.5 [mm].

It can be understood that the volume zone V having the large luminous intensity of the lamp 101 nearly corresponds to the outgoing ranges R=approximately 0–4.5 [mm] and R=approximately 2–7 [mm] of the losses Ld and Le previously shown. That is, the light in the volume zone V having the maximum luminous intensity can not be input to the incident plane 103a, namely, this light becomes a loss.

In order to solve the above problems, it can be recognized to enlarge the size of the incident plane 103a. However, considering a viewpoint of the yield rate of the manufacture, it is quite advantageous to use photo modulation elements such as DMD chips and liquid crystal panels have a small incident area to input lights. Further, because the size of the incident plane 103a of the rod integrator 103 becomes small in proportional to the size of the photo modulation element from a view point of magnification of lenses, the above method cannot easily solve this problem.

SUMMARY OF THE INVENTION

The present invention has been made to solve the above conventional drawbacks of the conventional lamp and the conventional condensing optical system using the conventional lamp described above.

It is therefore an object of the present invention to provide a lamp for outgoing a light flux having a suppressed divergent angle.

Moreover, it is another object of the present invention is to provide a condensing optical system capable of reducing losses caused at the incident plane of a rod integrator by reducing the spreading of an illuminant image at a condensing point of a lamp front lens.

Still furthermore, it is another object of the present invention is to provide an image display device capable of improving a brightness of an image projected on a screen by reducing losses caused at the incident plane of the rod integrator.

A lamp according to the present invention has an illuminant section, a lamp reflector, and a lamp front glass. In the lamp, the ellipsoidal of revolution of the lamp reflector is formed by deforming with a aspherical reflection surface which is in symmetry of rotation to the optical axis. At least one of the incident plane and the outgoing plane of the lamp front glass is so formed by deforming with a aspherical lens surface which is in symmetry of rotation to the optical axis. A different power for each radiation direction is applied to each light flux from the illuminant by the aspherical reflection surface and the aspherical lens surface apply in order to suppress a distribution of a divergent angle at the outgoing plane of the lamp front lens.

A condensing optical system according to the present invention has the lamp of the present invention and an integrator optical system. The integrator optical system receives through its incident plane a light flux output from the lamp which is condensed on a condensing point of the aspherical lens surface of the lamp, and reflects the light flux by its side surface, and outputs the light flux through its outgoing plane.

An image display device according to the present invention has the condensing optical system of the present invention, a relay optical system, an optical modulation element, and a projecting optical system. The relay optical system relays lights output from the condensing optical system. The optical modulation element gives image information the lights output from the relay optical system, and outputs the lights with the image information. The projecting optical system projects the lights with the image information output from the optical modulation element. The screen receives the lights projected by the projecting optical system and displays the image based on the image information.

BRIEF DESCRIPTION OF THE DRAWINGS

Other objects, features and advantages of the present invention will become apparent from the following description taken in conjunction with the accompanying drawings, in which:

FIG. 17 is a diagram showing a configuration of a condensing optical system according to a third embodiment of the present invention;

FIGS. 19A and 19B are diagrams showing the operation and the effect of the condensing optical system according to the third embodiment of the present invention.

DETAILED DESCRIPTION OF THE PREFERRED EMBODIMENTS

A detailed description will be given, with reference to the accompanying drawings, of the preferred embodiments of the present invention.

First Embodiment

Figure 9:
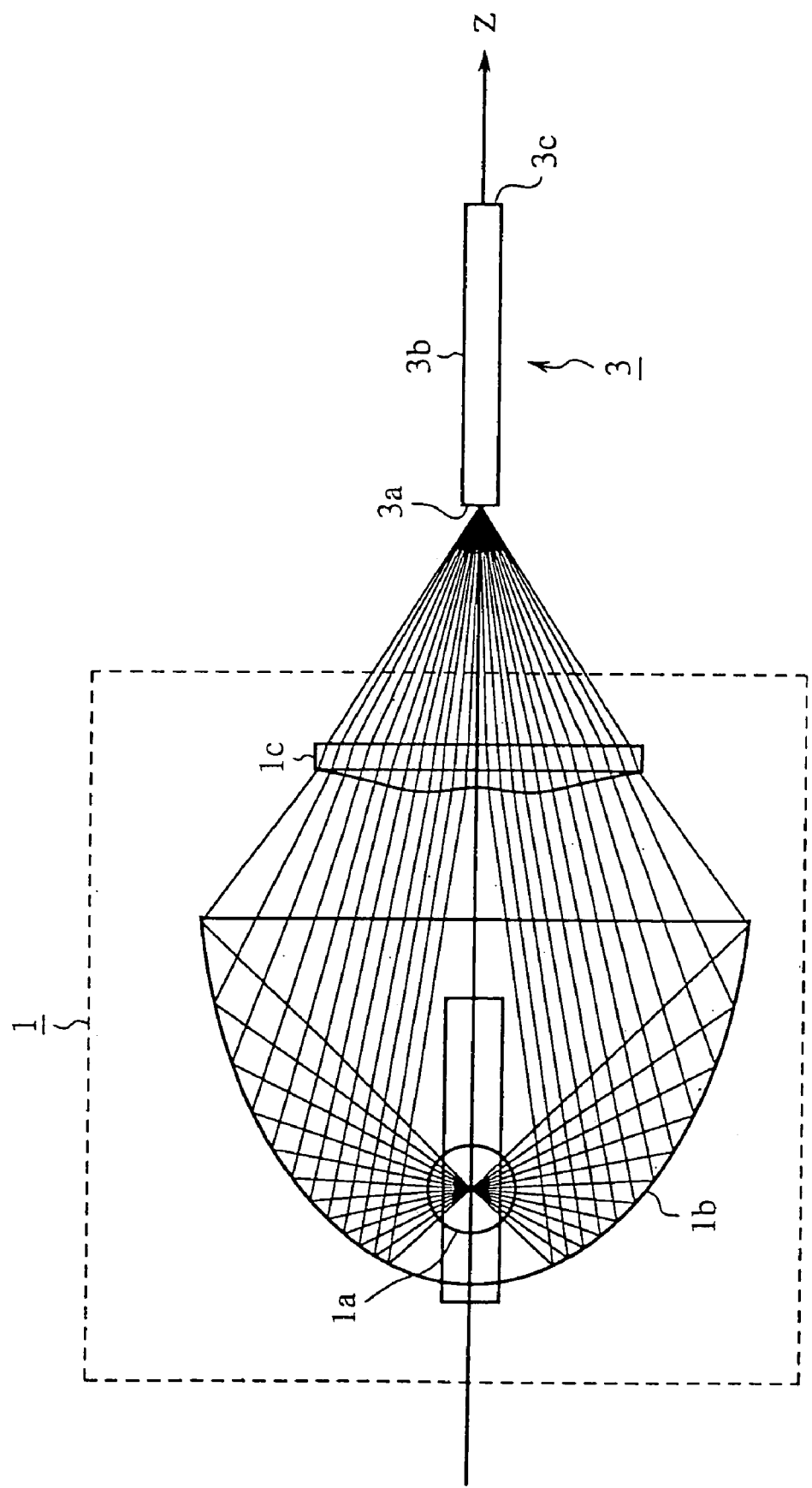
FIG. 9 is a diagram showing a configuration of a condensing optical system to which a lamp of a first embodiment of the present invention is applied.

FIG. 9 is a diagram showing a configuration of a condensing optical system to which the lamp according to a first embodiment of the present invention is applied. FIG. 9 shows a sectional view of the condensing optical system which is cut by an optional plane including an optical axis. In FIG. 9, reference number 1 designates a lamp, reference character 1a denotes an illuminant, 1b indicates a deformed lamp reflector, and 1c designates a lamp front glass. The lamp 1 of the first embodiment comprises the illuminant 1a, the deformed lamp reflector 1b, and the lamp front lens 1c.

Figure 2:
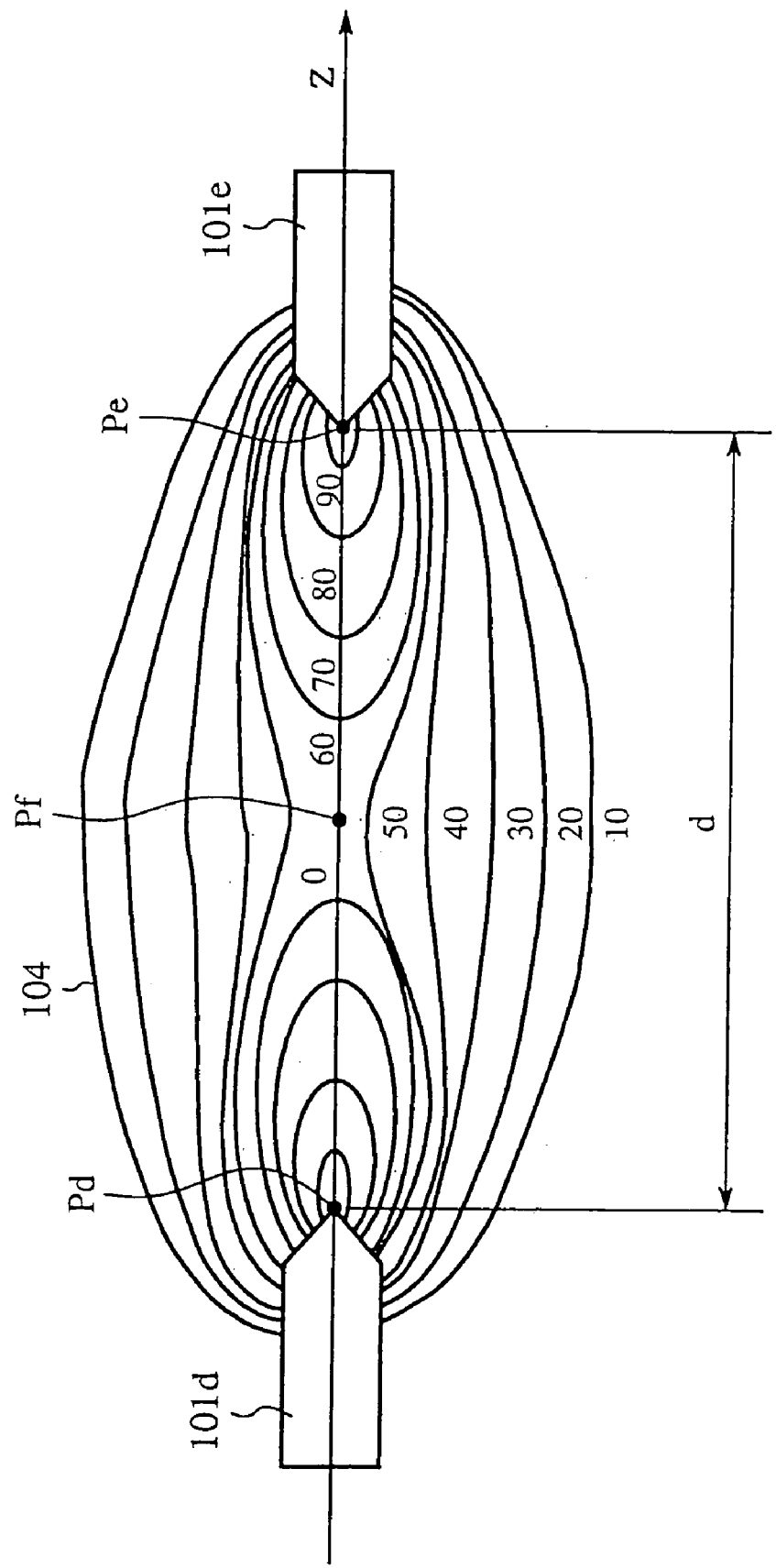
FIG. 2 is a diagram showing a typical brilliance distribution characteristic of an illuminant.

The illuminant 1a is so formed that electrodes are placed at the center of the glass bulb of the lamp 1. The lights are generated in and emitted from the area between the electrodes. The area between the electrodes is the light source of the illuminant 1a. The illuminant 1a is equal in configuration to the illuminant 101a of the prior art technique. The illuminant 1a has the brilliance distribution characteristic shown in FIG. 2 and the orientation distribution characteristic shown in FIG. 3.

The deformed lamp reflector 1b as a feature component of the lamp 1 is so designed that the light from the illuminant 1a is reflected by the aspheric reflection surface of the deformed lamp reflector 1b and the reflected light is output to the outside through the aperture of the deformed lamp reflector 1b.

The aspheric reflection surface of the deformed lamp reflector 1b is a concave mirror obtained by rotating a plane curve represented by a polynominal around its rotation axis (optical axis). That is, the aspheric reflection surface has a shape approximately similar to an ellipsoid of revolution.

The lamp front lens 1c as one feature element of the lamp 1, just like the deformed lamp reflector 1b, is an aspheric surface lens which is symmetrical about the rotation axis (optical axis). This lamp front lens 1c is so formed that it covers the aperture of the deformed lamp reflector 1b. This configuration can protect persons and other components from the occurrence of a burst of the illuminant 1a which rarely occurs, and acts as the function of the lens to the reflected light from the deformed lamp reflector 1b.

The lamp front lens 1c shown in FIG. 9 has a one side aspheric surface lens in which a concave-convex lens surface is formed only on the incident plane for the reflected light from the deformed lamp reflector 1b. However, the present invention is not limited by this configuration. For example, it is acceptable to use a one side aspheric lens in which the lens surface is formed on the outgoing plane, or to use a both side aspheric lens in which the lens surface is formed on both the incident surface and the outgoing plane, according to applications.

Reference number 3 designates a column-shaped glass called "rod integrator" (as an integrator optical system) in which the light received through the incident plane 3a thereof is totally reflected repeatedly at the side surface 3b while passing through the inside of the rod integrator 3, and the light is finally output through the outgoing plane 3c. In order to increase the receiving efficiency of light, namely, to increase the amount of the received light through the incident plane 3a as many as possible, and to suppress a leaking loss, the incident plane 3a of the rod integrator 3 is placed at the condensing point (or a lens focus) of the lamp front lens 1c.

The line Z connecting the center of the illuminant 1a and the center of the incident plane 3a of the rod integrator 3 is an optical axis. This optical axis Z coincides with the rotation axis of the deformed lamp reflector 1b and the rotation axis of the lamp front lens 1c.

The forward direction of the optical axis Z takes the forward direction of the light.

The condensing optical system according to the first embodiment comprises the lamp 1 and the rod integrator 3.

A description will now be given of the operation of the condensing optical system of the first embodiment.

As has previously been described, the illuminant 1a has the same brilliance distribution characteristic and the same orientation distribution characteristic of the conventional one.

Most of the lights emitted from the illuminant 1a are reflected by the aspheric reflection surface of the deformed lamp reflector 1b and the reflected lights travel toward the forward direction of the optical axis Z.

The reflected lights by the deformed lamp reflector 1b outgo through the lamp front lens 1c, the main light thereof is condensed into the condensing point on the lamp front lens 1c.

In the conventional lamp 101 previously described, the divergent angle of the outgoing light from the lamp front glass 101c is changed according to the distance measured from the optical axis Z. On the contrary, in the lamp 1 of the present invention the divergent angle of the outgoing light from the lamp front lens 1c is not changed, namely becomes constant, regardless of any change of the distance measured from the optical axis Z.

The outgoing light emitted rom the lamp front lens 1c is refracted by the lamp front lens 1c, condensed into the condensing point, input into the incident plane 3a of the rod integrator 3, and transmitted through the inside of the rod integrator 3.

Figure 4:
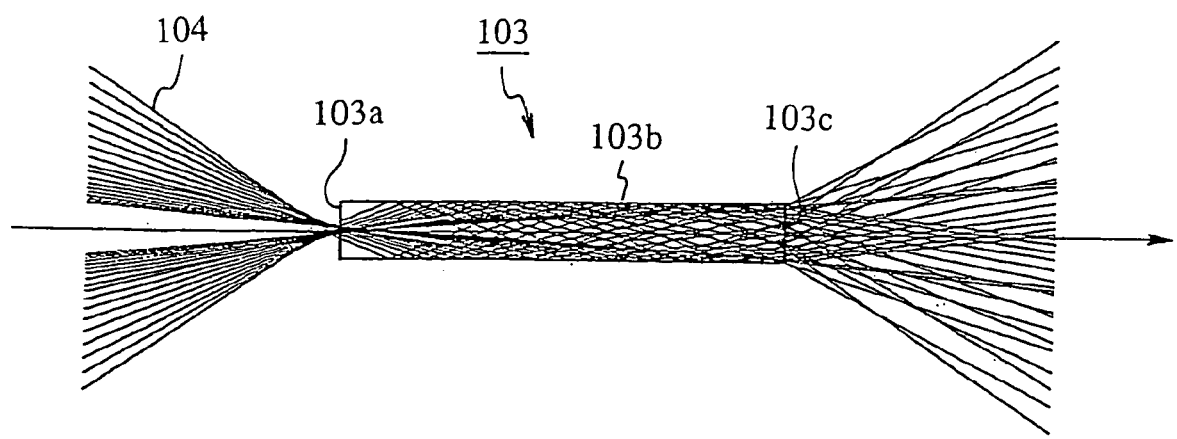
FIG. 4 is a diagram showing an optical path of light transmitted through a rod integrator.

Because the condensing optical system of the first embodiment is so designed that the incident lights from the lamp front lens 1c into the incident plane 3a of the rod integrator 3 are totally reflected at the side surface of the rod integrator 3, the incident lights through the incident plane 3a are transmitted while performing the total reflection repeatedly at the side surface 3b of the rod integrator 3 and output through the outgoing plane 3c to outside of the rod integrator 3, like the conventional case shown in FIG. 4.

Figure 5A:
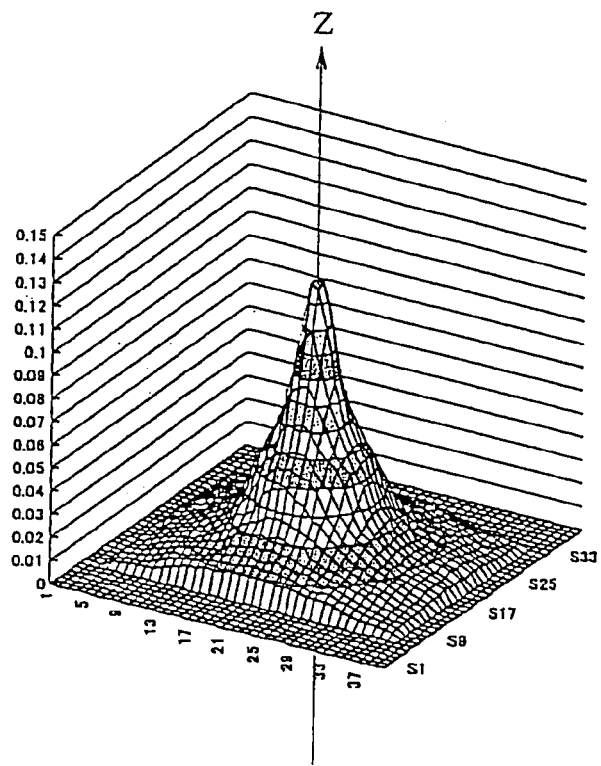
FIGS. 5A and 5B are diagrams showing illumination distribution characteristics of incident light and outgoing light of the rod integrator.
Figure 5B:
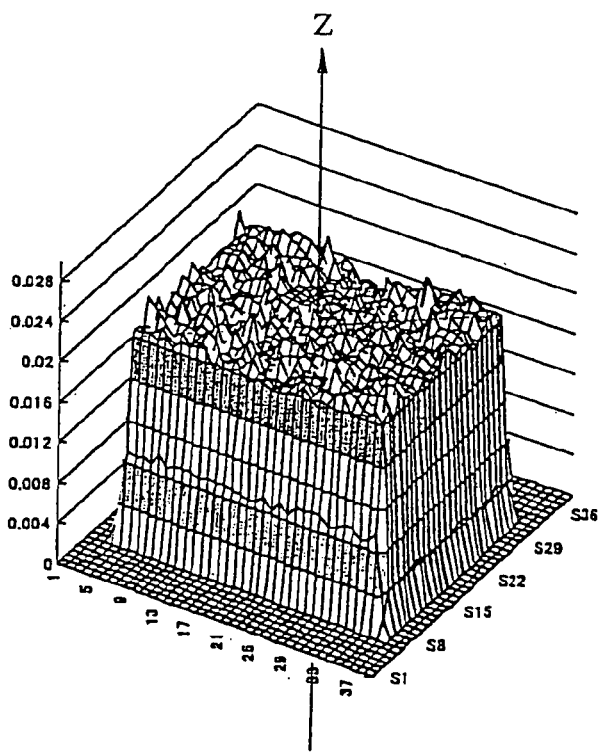

Since the phenomenon of the total reflection is used, there is no leaking of the light through the side surface 3b and this causes no loss in the rod integrator 3. Because the lights from the lamp front lens 1c are input into the incident surface 3a with various incident angles, the illumination distribution of the reflected lights becomes approximately uniform at the outgoing plane 3c, like the conventional one shown in FIG. 5B.

The lights having the uniform illumination distribution generated by the rod integrator 3 are transferred by the following optical system. The applications of the lamp and the condensing optical system of this embodiment into the image display device using the DMD chip and the liquid crystal panel will be described in the explanation of the fourth embodiment.

Next, a description will now be given of the concrete feature of the lamp 1 of the first embodiment.

Figure 1:
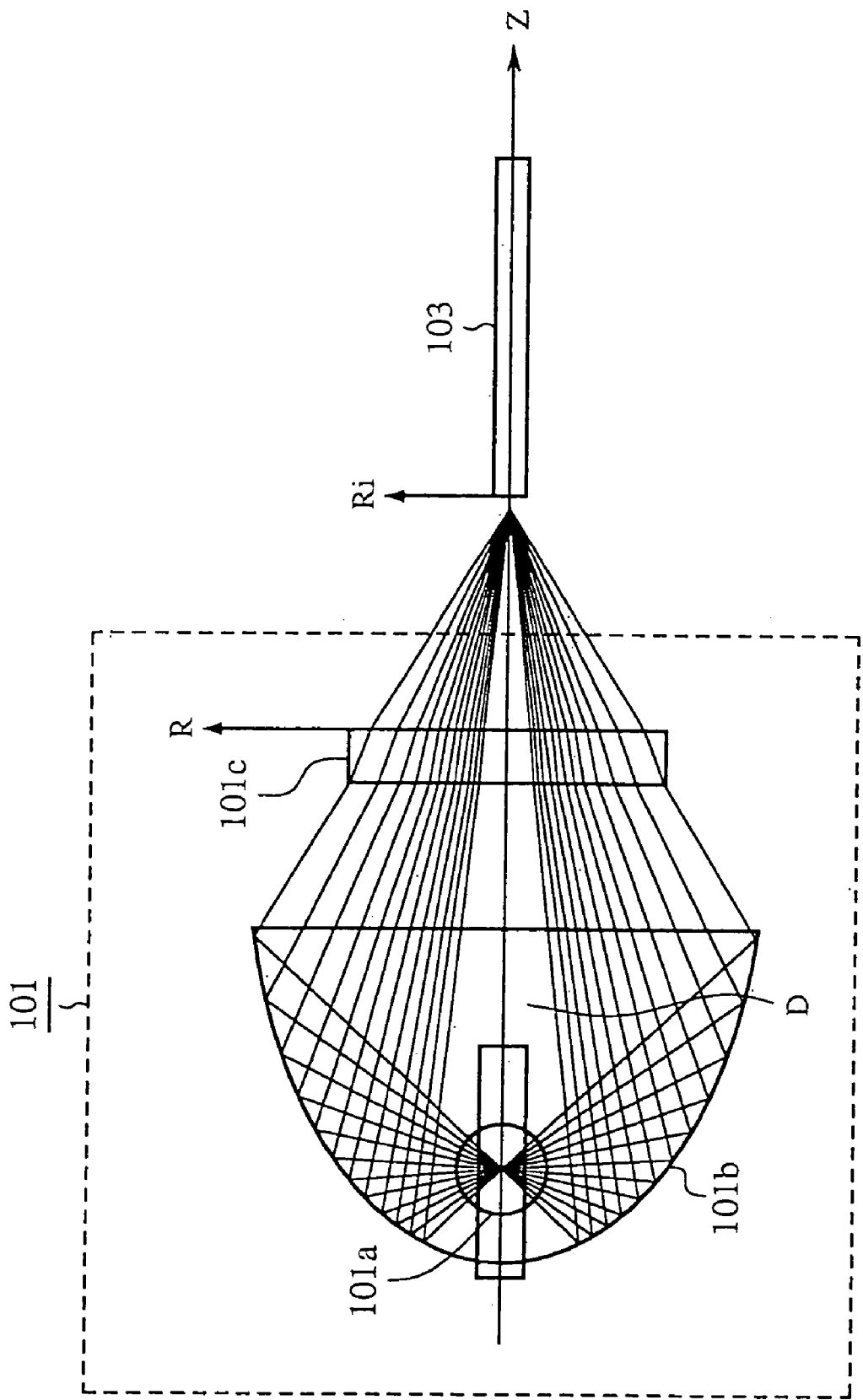
FIG. 1 is a diagram showing a configuration of a condensing optical system using a conventional lamp.
Figure 10A:
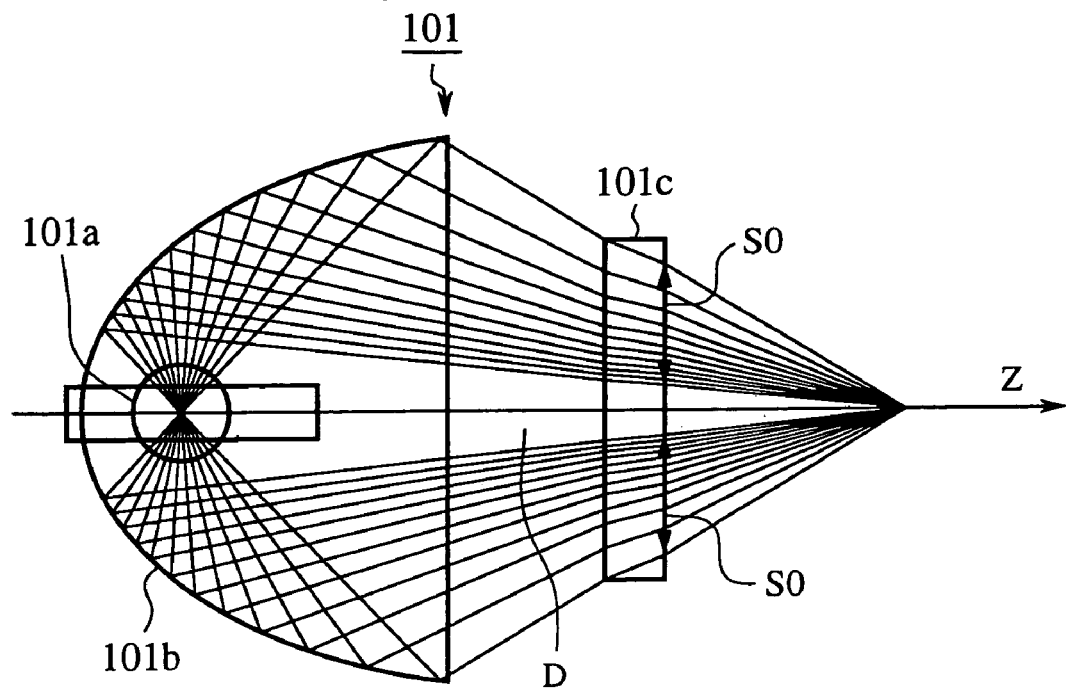
FIGS. 10A and 10B are diagrams to compare the lamp of the first embodiment with the conventional lamp.
Figure 10B:
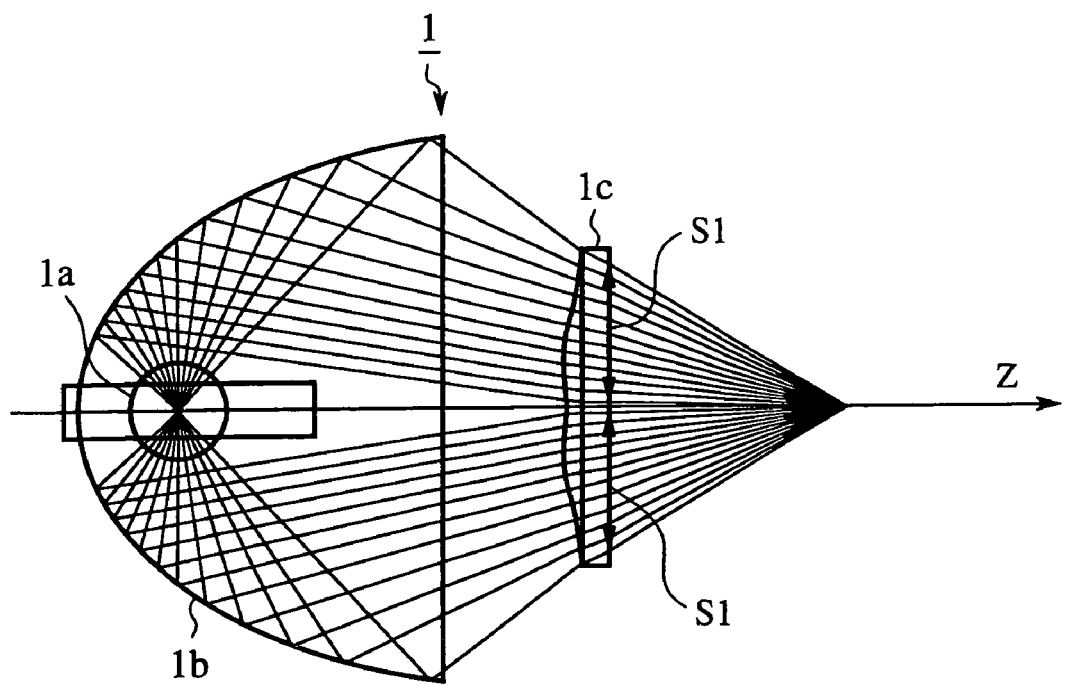

FIGS. 10A and 10B are diagrams to compare the lamp 1 of this embodiment with the conventional lamp 101. FIG. 10A shows the case of the conventional lamp 101 and FIG. 10B shows the case of the lamp 1. In FIG. 10A and FIG. 10B, the same components in the configurations shown in FIG. 9 and FIG. 1 are referred to with the same reference numbers and characters.

FIG. 10A and FIG. 10B show the optical light flux group emitted from the center point Pf of each of the illuminants 1a and 101a every a same radiation angle, respectively.

In the conventional lamp 101 shown in FIG. 10A, the distribution of the light flux on the outgoing plane (whose sectional area is S0) of the lamp front lens 101c which intersects at right angles to the optical axis Z does not uniform, namely, the distribution of the light flux close to the optical axis Z becomes condensation, and the distribution of the light flux apart from the optical axis is gradually rarefaction.

When observing the sectional area S0, through which the lights pass, from the direction front of the forward direction of the optical axis Z, there is no light in the dead zone D around the optical axis Z.

In contrast thereto, in the case of the conventional lamp 1 shown in FIG. 10B, the light flux emitted every uniform divergent angle from the center point Pf of the illuminant 1a thereof is reflected on the lamp front lens 1c with the aspheric reflection lens and condensed into the condensing point on the optical axis Z of the lamp front lens 1c with F value=1, for example.

When compared with the lamp shown in FIG. 10A, in the lamp 1 shown in FIG. 10B the aspherical reflection surface of the deformed lamp reflector 1b reflects the light flux from the illuminant 1a into the dead zone D, and the aspherical lens surface of the lamp front lens 1c condenses it into the condensing point. Briefly summarizing, the deformed lamp reflector 1b has the function to enlarge the sectional area of the light flux, and the lamp front lens 1c has the function to condense the light flux into the condensing point by adjusting the angle of the light flux of the expanded sectional area.

Accordingly, in the lamp 1 shown in FIG. 10B, when observing from the forward direction of the optical axis Z the outgoing plane of the lamp front lens 1c which is perpendicularly intersecting to the optical axis Z, the dead zone D disappears. In particular, in the first embodiment, the distribution of the light flux on the sectional area S1 becomes uniform regardless of the distance measured from the optical axis Z.

Figure 8:
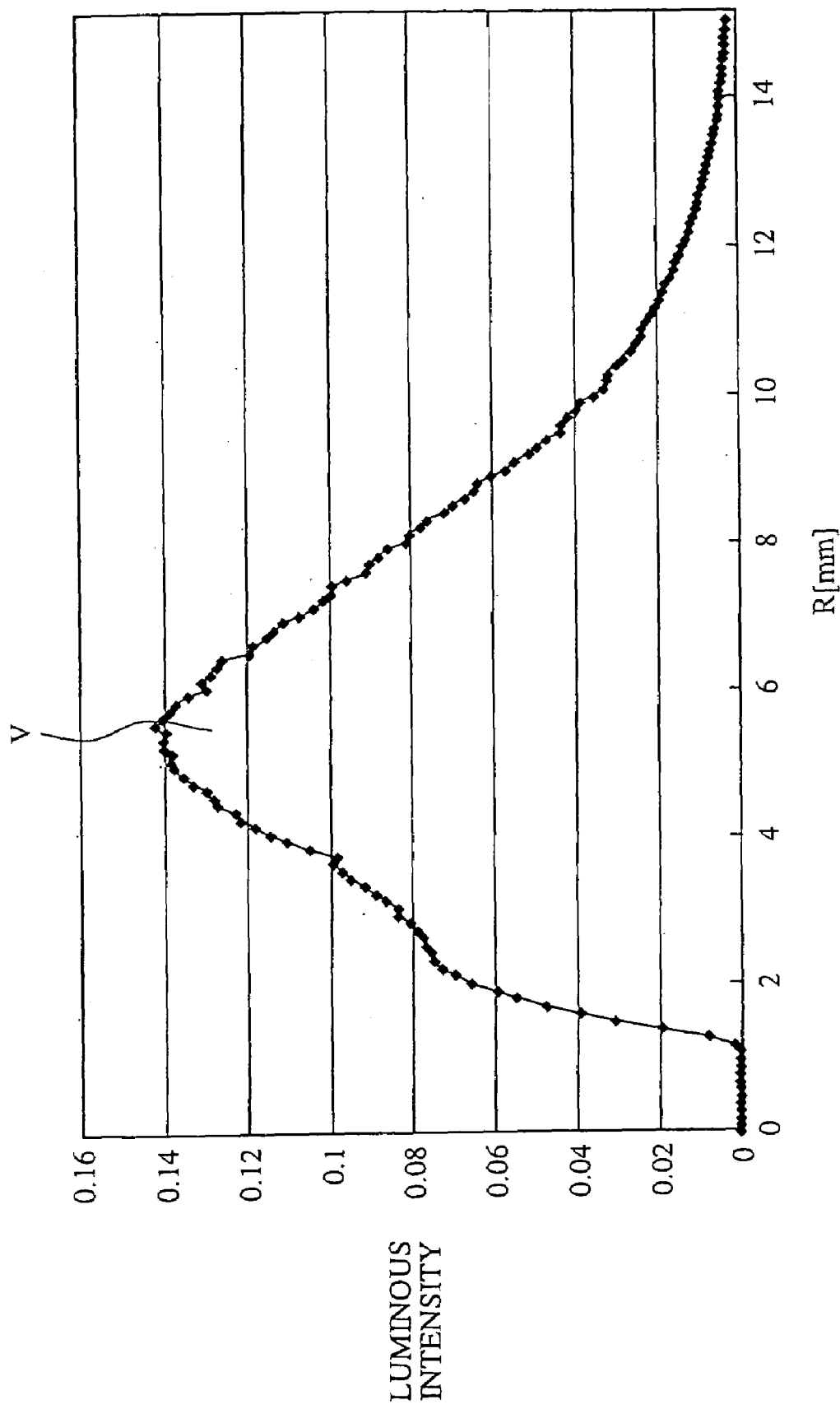
FIG. 8 is a diagram showing a luminous intensity distribution of the outgoing light of the lamp front glass.

In general principle, it is well known that the decreasing of the sectional area of the light flux increases the divergent angle of the light emitted from each point on the sectional area. As has already previously described in "Description of the related art" section the neighboring of the optical axis in the lamp reflector 101b where the divergent angle of the reflected light becomes large is a part where the light in the volume zone having the luminous intensity distribution characteristic shown in FIG. 8 is reflected, and the area apart from the optical axis Z where the divergent angle of the light becomes small is a part where the light having the luminous intensity lower than the light in the volume zone is reflected. This phenomenon decreases the amount of the incident lights into the incident plane 3a of the rod integrator 3.

On the contrary, according to the lamp 1 of the first embodiment shown in FIG. 10B, the sectional area of the lights is expanded by the aspherical reflection surface of the deformed lamp reflector 1b so that the distribution of the lights in the neighboring of the optical axis Z becomes low and the divergent angle of the outgoing light flux from the lamp 1 becomes small.

In addition, because the sectional area of the light flux is expanded at the incident side of the lamp front lens 1c, front of the sectional area S1, the lamp front lens 1c adjusts the angle of the light under the adequately small divergent angle so that the lights from the lamp front lens 1c are transmitted into the condensing point. This can increase the amount of the incident lights by the rod integrator 3.

Figure 11A:
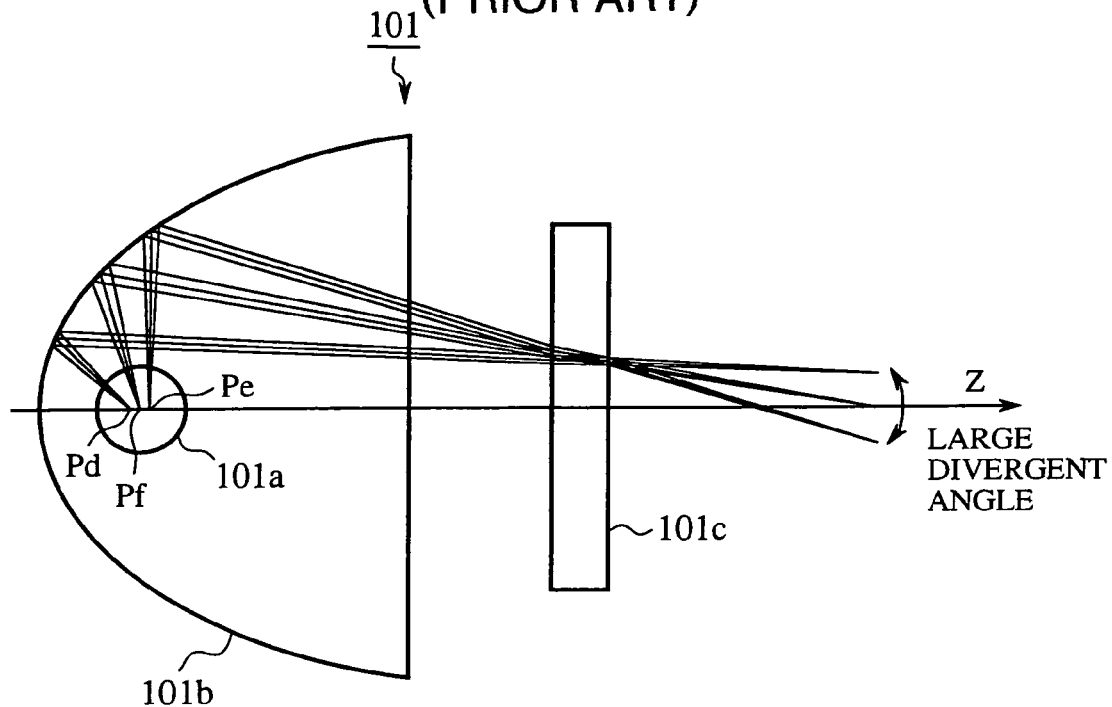
FIGS. 11A and 11B are diagrams to compare divergent angle s of outgoing light fluxes from the lamps of the first embodiment and the conventional lamp.
Figure 11B:
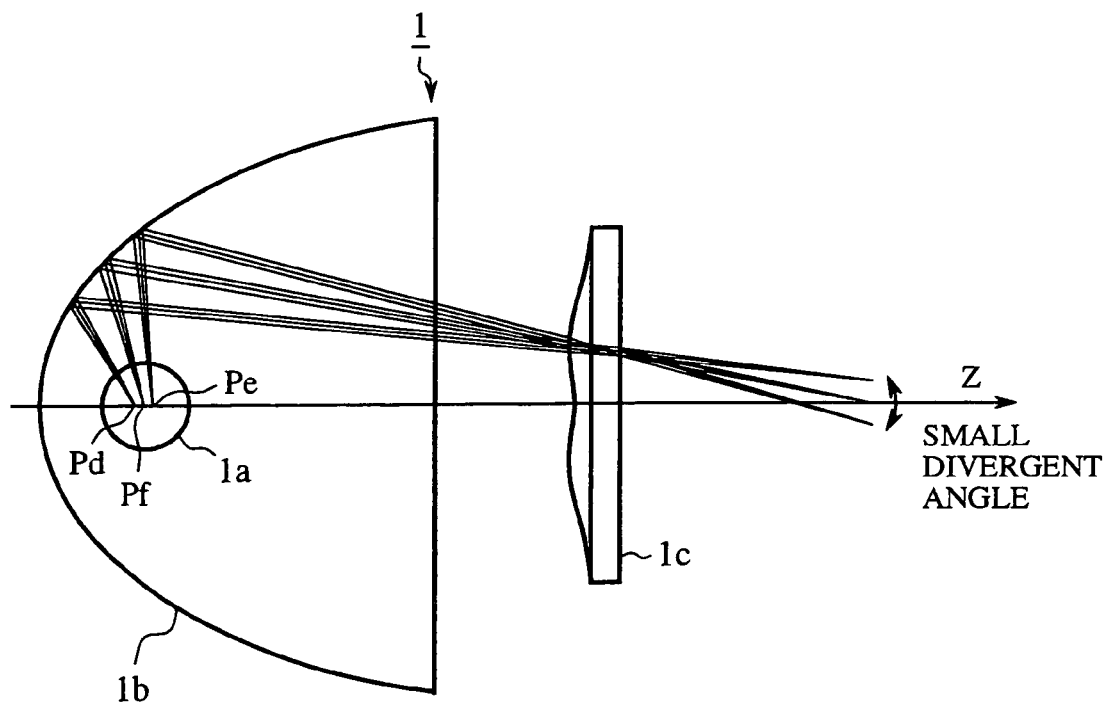

FIG. 11A and FIG. 11B show the comparison of the divergent angles of the conventional lamp 101 and the lamp 1 of the first embodiment. FIG. 11A shows the divergent angle of the conventional lamp 101. FIG. 11B shows the divergent angle of the lamp 1 of the first embodiment. Both FIG. 11A and FIG. 11B compare the divergent angles of the light fluxes at optional outgoing points, after emitted from the front points Pd and Pe and the center point Pf close to the electrodes of the illuminants 101a and 1a.

As can be understood from FIGS. 11A and 11B, it is possible for the lamp 1 of the first embodiment to output the light flux with a smaller divergent angle when compared with the case of the conventional lamp 101.

Figure 6:
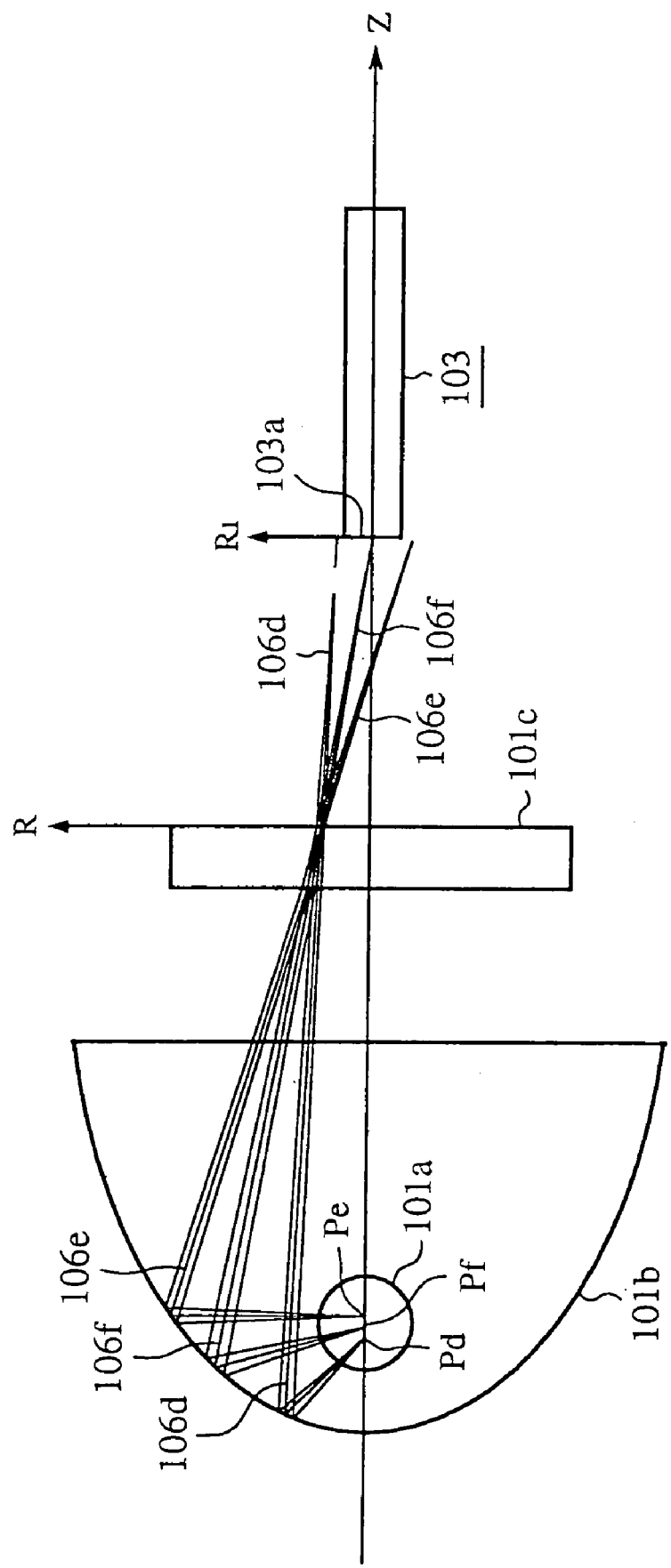
FIG. 6 is a diagram to explain the illuminant image generated on the incident plane of the rod integrator.

A description will now be given of the result of the concrete analysis for the effects of the first embodiment, like the case of the conventional technique shown in FIG. 6 and FIG. 7.

Figure 13:
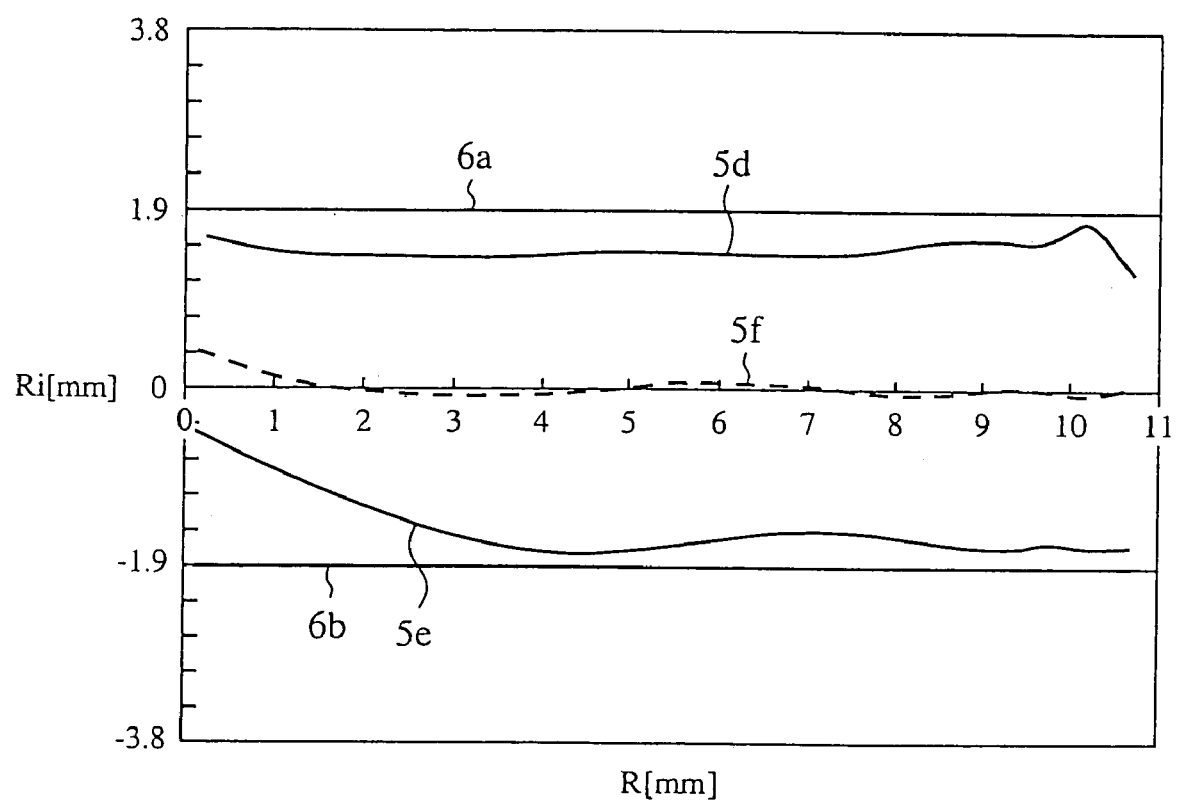
FIG. 13 is a diagram showing the relationship between the light outgoing position of the lamp front glass and the light incident position at the incident plane of the rod integrator.

FIG. 13 shows the result of the analysis of the incident-light position Ri on the incident plane 3a of the rod integrator 3, where the outgoing points of the lights 5d, 5e, and 5f emitted from the front points Pd and Pe on the outgoing plane of the lamp front lens 1c is R (as the distance measured from the optical axis Z).

FIG. 13 shows the relationship between the light outgoing position of the lamp front lens 1c and the light incident position of the incident plane 3a. FIG. 13 corresponds to FIG. 7 of the conventional case. In FIG. 13, the same components of the case shown in FIG. 9 are referred to with the same reference numbers and characters.

Figure 12:
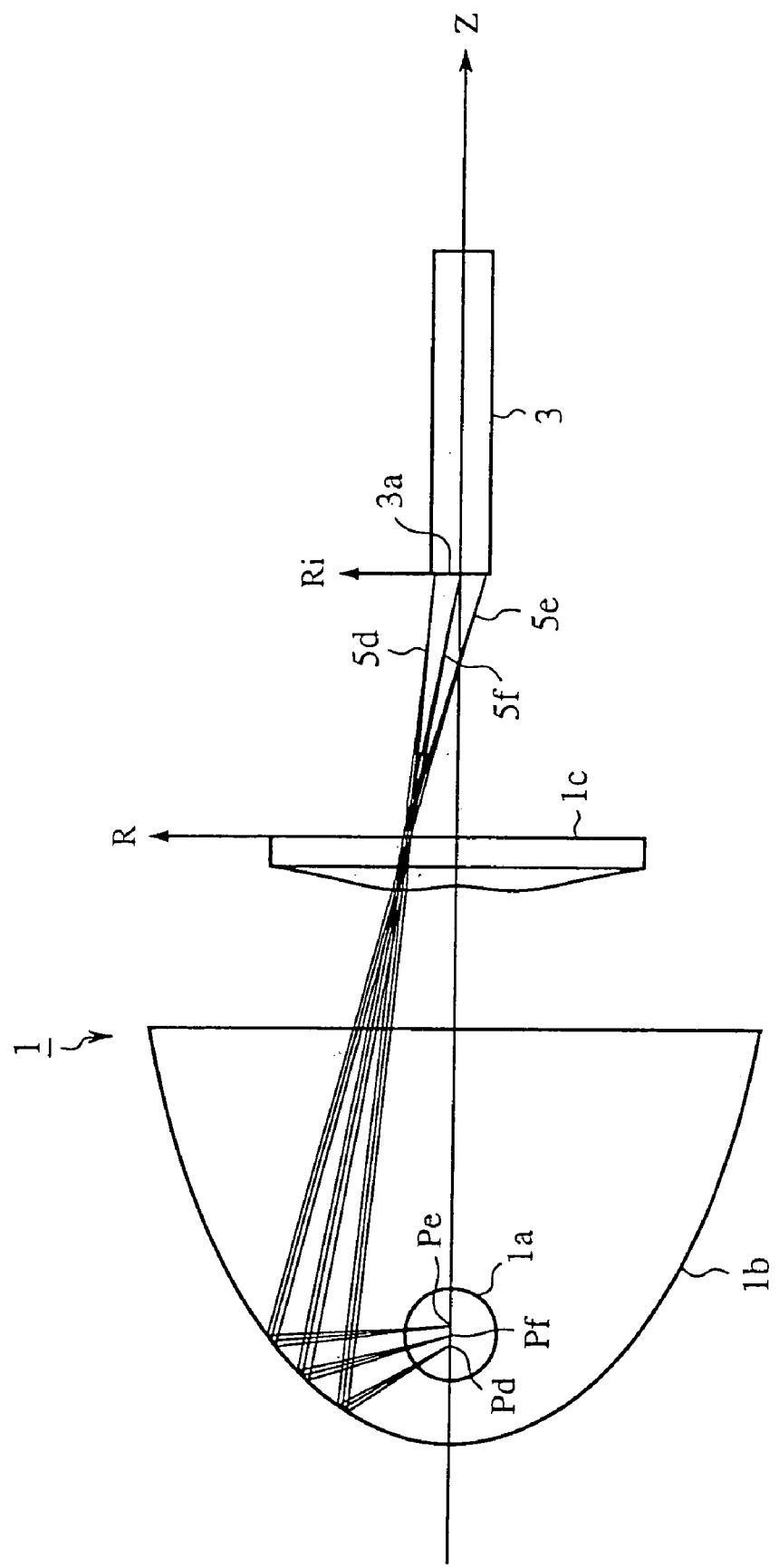
FIG. 12 is a diagram showing the outgoing position on the outgoing plane of the lamp front glass and the incident point on the incident plane of the rod integrator.

In FIG. 13, the horizontal axis shows the outgoing position of the light flux from the lamp front lens 1c. This outgoing position is the distance R measured from the optical axis Z shown in FIG. 12. The vertical axis shows the position of the incident plane 3a of the rod integrator 3 to which the light flux is input. This position corresponds to the distance Ri from the optical axis Z shown in FIG. 12.

In this analysis, the light is condensed into the incident plane 3a by the lamp front lens 1c with F value=1, where the arc length d is 1.1 [mm] (d=1.1 [mm]), the aperture diameter of the deformed lamp reflector 1b is 40 [mm] (d=40 [mm]), and the sectional area of the incident plane 3a is 3.8×5.5 [mm$^2$].

The line Ri=±1.9 [mm] designated by the reference characters 6a and 6b shown in FIG. 13 shows the boundary of the incident plane 3a, and the area |Ri|≦1.9 [mm] corresponds to the size of the incident plane 3a.

Each of the outgoing lights 5d, 5e, and 5f from the lamp 1 is completely within the area from the intersection point of the optical axis Z of the lamp front lens 1c to the outside diameter of the outgoing plane of the lamp front lens 1c, that is, in the incident position |Ri|≦1.9 [mm] surrounded by the boundaries 6a–6b in the total outgoing range R=0–11 [mm].

Accordingly, there occurs no losses Ld and Le, contrarily to the conventional case, and the light fluxes are always input into the incident plane 3a.

In the position of the illuminant 1a to the deformed lamp reflector 1b, the direction of the arc length d of the illuminant 1a is coincided with the optical axis Z, and the aspheric reflection surface of the deformed lamp reflector 1b is designed as follows according to the brilliance distribution characteristic, the orientation distribution characteristic, the volume zone V, and various characteristics of the light emitted by the illuminant 1a, for example.

Figure 14:
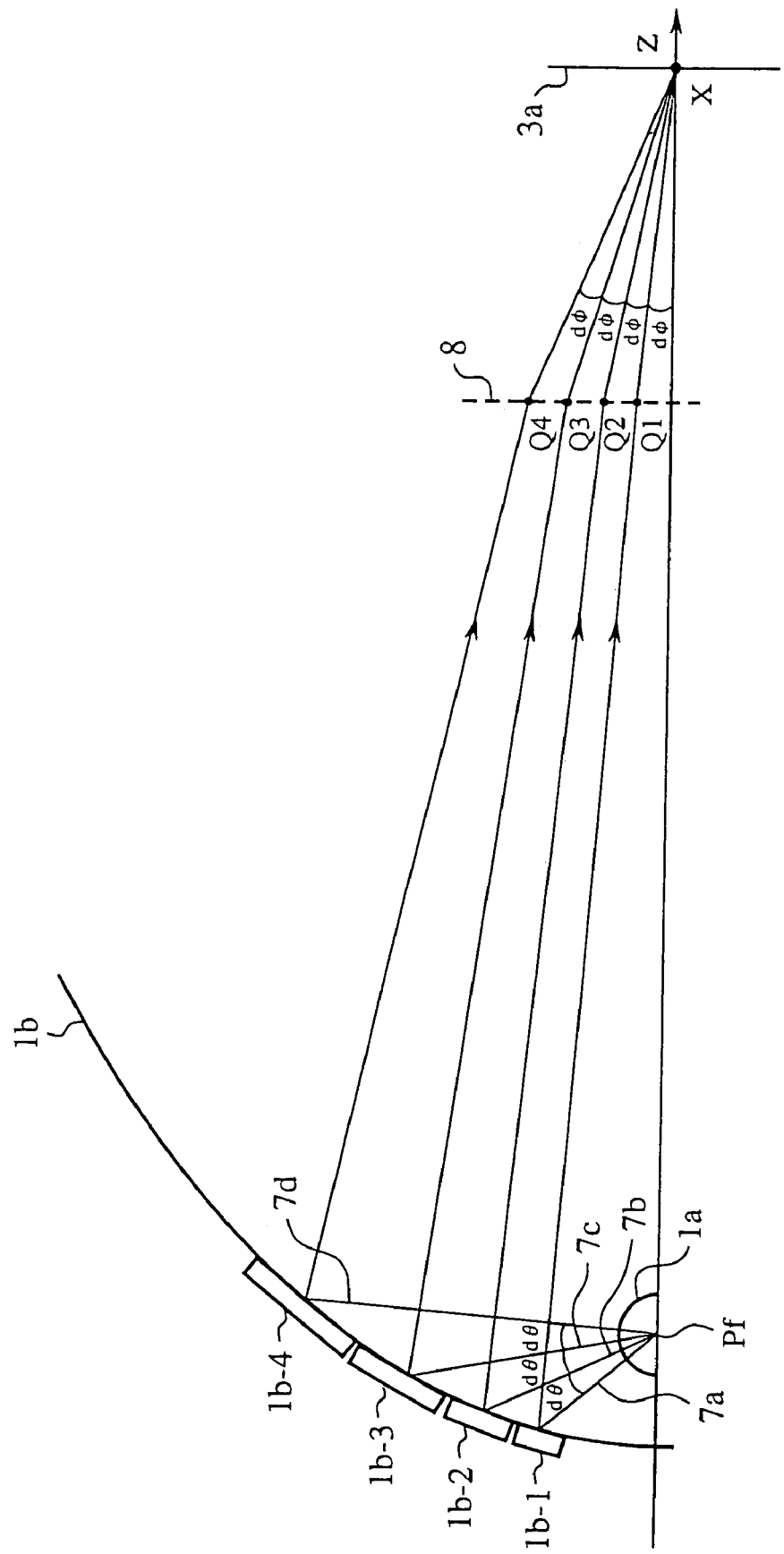
FIG. 14 is a diagram showing a design example of an aspheric reflection surface of a deformed lamp reflector to an illuminant.

FIG. 14 is a diagram showing a design example of the aspheric reflection surface of the deformed lamp reflector 1b to the illuminant 1a. In FIG. 14, just like the case shown in FIG. 9, the deformed lamp reflector 1b is cut by an optional plane including the optical axis Z. The same components in the case shown in FIG. 9 will be referred to with the same reference numbers and characters.

In FIG. 14, the position of the condensing point (on the incident plane 3a of the rod integrator 3) on the optical axis Z to the illuminant 1a is firstly determined. The setting position 8 for the lamp front lens 1c is then determined. Following, the N lights are distributed from the condensing point X toward the backward direction of the optical axis Z with uniform angle dϕ to the maximum angle 30 degree (corresponding to F value=1), and each point of the intersections to the setting point 8 of the lamp front lens 1c is Q1, Q2, Q3, Q4, . . . , and QN.

Figure 3:
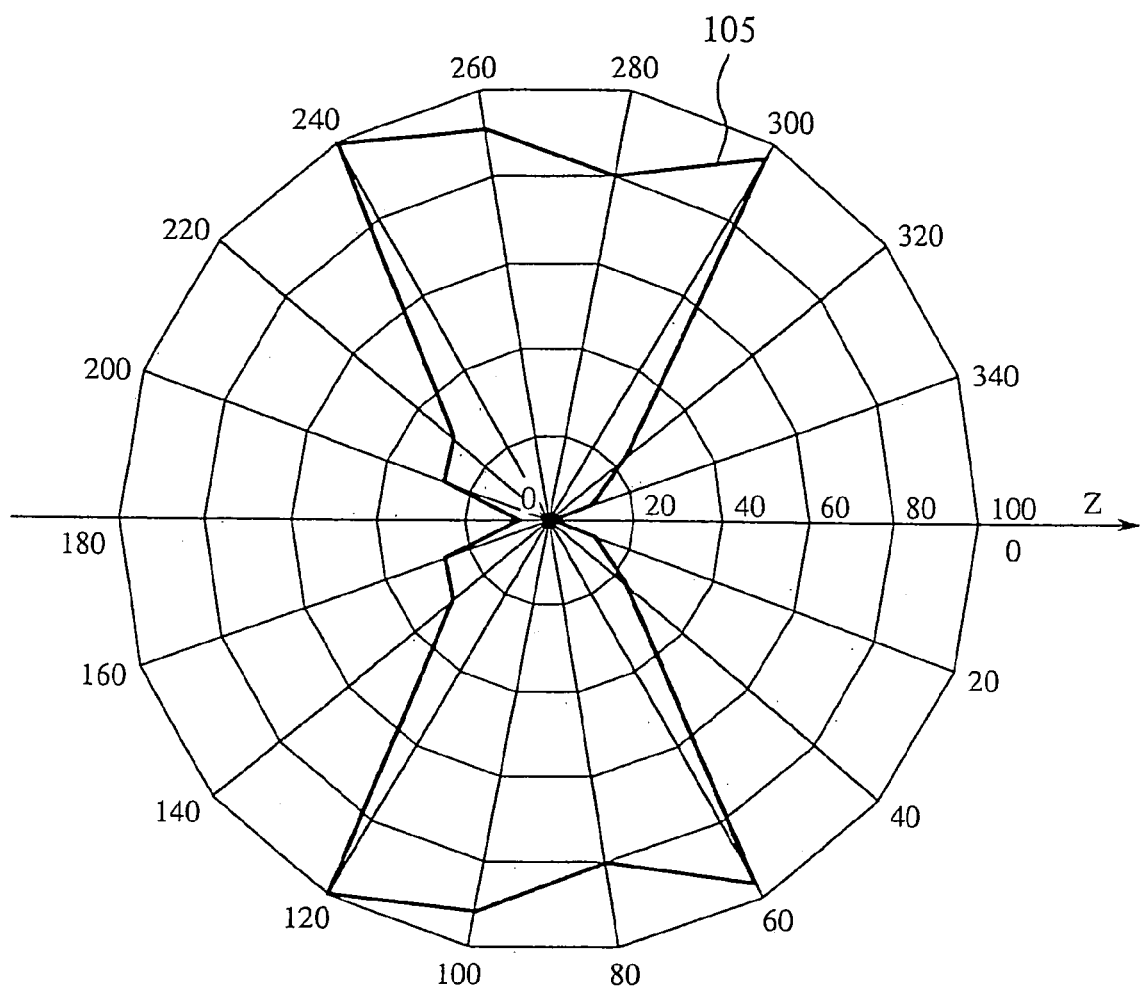
FIG. 3 is a diagram showing a typical orientation distribution characteristic of an illuminant.

On the other hand, because the expansion of the lights from the center point Pf of the illuminant 1a set on the optical axis Z is determined as shown in FIG. 3, the N lights 7a, 7b, 7c, 7d, . . . , and 7N are distributed with the minimum angle to the maximum angle with uniform angle dθ, where N is the number of lights distributed at the condensing point X.

The deformed lamp reflector 1b is divided into the infinitesimal mirrors 1b-1, 1b-2, 1b-3, 1b-4, . . . , and the light 7a with the maximum outer irradiation angle is reflected to the intersection Q1 on the setting point 8 by the infinitesimal mirror 1b-1, the unique angle of the infinitesimal mirror 1b-1 to the optical axis Z is determined.

Next, the reflection surface of the infinitesimal mirror 1b-1 is extended. The intersection between the second light 7b emitted from the illuminant 1a and the reflection surface of the extended infinitesimal mirror 1b-1 is defined as the position of the second infinitesimal mirror 1b-2. Because the light 7b is reflected to the intersection Q2 on the setting point 8 by the infinitesimal mirror 1b-2 on this position, the angle of the infinitesimal mirror 1b-2 to the optical axis Z is determined around the intersection between the second light 7b and of the reflection surface of the extended infinitesimal mirror 1b-1. Further, the reflection surface of the infinitesimal mirror 1b-2 is extended, The intersection between the third light 7c emitted from the illuminant 1a and the reflection surface of the extended infinitesimal mirror 1b-2 is defined as the position of the third infinitesimal mirror 1b-3. The angle of the infinitesimal mirror 1b-3 is determined so that the light 7b is reflected at the infinitesimal mirror 1b-3 to the intersection Q2.

Hereinafter, like the same manner described above, the angles of all of the infinitesimal mirrors to the lights 7d, 7f, . . . can be determined within the entire range of the outgoing lights from the illuminant 1a. Here, the setting of the value N with a large value makes it possible to determine the shape of the aspherical reflection surface of the deformed lamp reflector 1b.

In addition, the determination of the index of reflection of the glass for the lamp front lens 1c to be set at the position 8 makes it possible to determine the shape of the aspherical lens surface of the lamp front lens 1c because the inclination of the lens surface necessary for the reflection is determined based on the relationship between the incident angle of each light to each condensing point Q1, Q2, Q3, Q4, . . . , QN and the outgoing angle thereof.

As described above, according to the first embodiment, the lamp 1 has the illuminant 1a, the deformed lamp reflector 1b, and the lamp front lens 1c. The deformed lamp reflector 1b having the aspherical reflection surface in symmetry of rotation to the optical axis Z is obtained by deforming the ellipsoid of revolution of the lamp reflector 101b around the optical axis z. The lamp front lens 1c of aspheric lens surface in symmetric of rotation is obtained by deforming at least one of the incident plane and the outgoing plane of the lamp front glass 101c in symmetric of rotation to the optical axis Z. The light flux emitted from the center point Pf of the light source in the illuminant 1a is reflected by the deformed lamp reflector 1b, then output through the entire of the outgoing plane of the lamp front lens 1c with uniform density, and condensed. Accordingly, when compared with the conventional one, the lamp of the embodiment has the effect that it is possible to condense the light flux whose divergent angle is suppressed into the condensing point, and thereby to condense the light flux to the condensing point by reducing the size of the image of the illuminant 1a having the finite size as small as possible.

Further, according to the first embodiment, because the condensing optical system is made up of the lamp 1 and the rod integrator 3. The rod integrator 3 receives at the incident plane 3a the lights condensed at the condensing point and outputs the lights through the outgoing plane 3c after the total reflection in the rod integrator 3. When compared with the conventional one, it is possible to suppress the expansion of the illuminant image of the illuminant 1a at the lens focus and thereby to reduce the leaking loss of light generated at the incident plane 3a of the rod integrator 3.

Second Embodiment

In the first embodiment previously described, the light flux with a uniform radiation angle emitted from the center position Pf of the illuminant 1a is distributed uniformly by the deformed lamp reflector 1b onto the outgoing plane (sectional area S1), and the light flux having a constant divergent angle suppressed is output through the entire area of the outgoing plane.

However, the present invention is not limited by this case where the distribution at the outgoing plane is uniform. The second embodiment will explain the case where the weighting to the distribution of the light at the outgoing plane is weighted.

Figure 15:
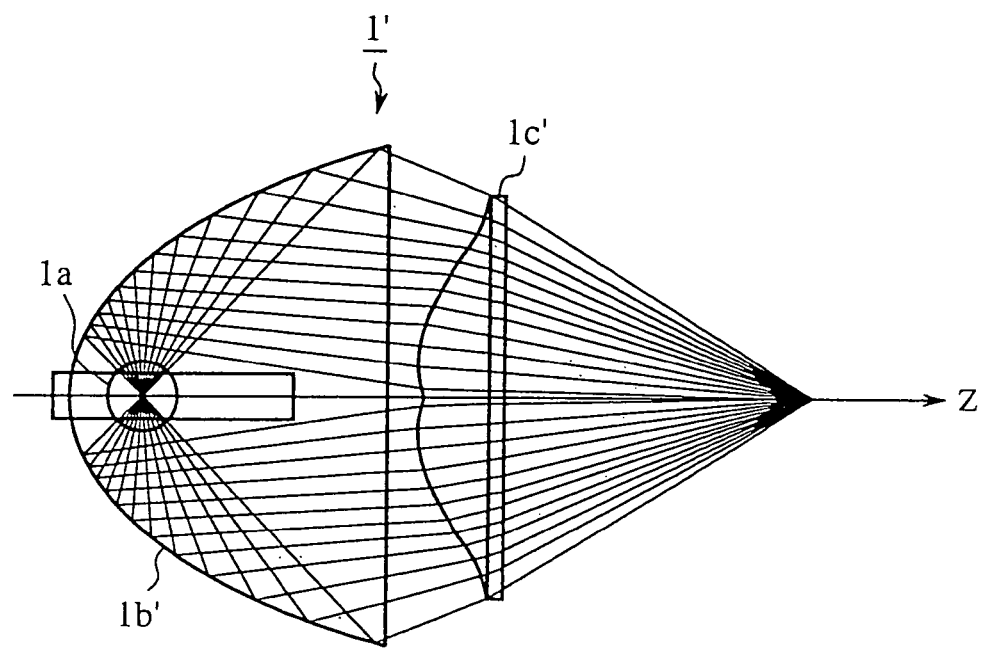
FIG. 15 is a diagram showing a configuration example of a lamp according to the second embodiment of the present invention.

FIG. 15 shows one example of a configuration of a lamp according to the second embodiment. In FIG. 15, the same components of the case shown in FIG. 9 will be referred to with the same reference numbers and characters.

In FIG. 15, reference character 1' designates a lamp of the second embodiment, 1b' denotes a deformed lamp reflector, 1c' indicates a lamp front lens. The aspherical reflector surface of the deformed lamp reflector 1b' reflects to the lamp front lens 1c' the light flux emitted from the center position Pf of the illuminant 1a with a uniform radiation angle. The aspherical lens surface of the lamp front lens 1c' condenses the light flux to the condensing position on the optical axis Z. When compared with the light distribution on the sectional area S1 in the case of the first embodiment, the light flux reflected on the deformed lamp reflector 1b' becomes wide in the area close to the optical axis Z, and become narrow when it is far from the optical axis Z.

That is, the distribution of the lights on the outgoing plane of the lamp front lens 1c' shown in FIG. 15 is not uniform, and is simply decreased according to the distance from the optical axis Z at the outgoing position on the outgoing plane, where the distribution of the lights in the area close to the optical axis Z is becomes low or sparse and the distribution of that in the area far from the optical axis Z becomes high. This distribution of the lights is continuously changed in inverse proportion according to the magnitude of the distance measured from the optical axis Z.

Thus, the sectional area of the light flux in the area close to the optical axis Z on the outgoing plane of the lamp front lens 1c' becomes large, where the light can be output with a smaller divergent angle.

The sectional area of the light flux in the area apart from the optical axis Z on the outgoing plane of the lamp front lens 1c' becomes small and where the light can be output with a larger divergent angle.

Figure 16:
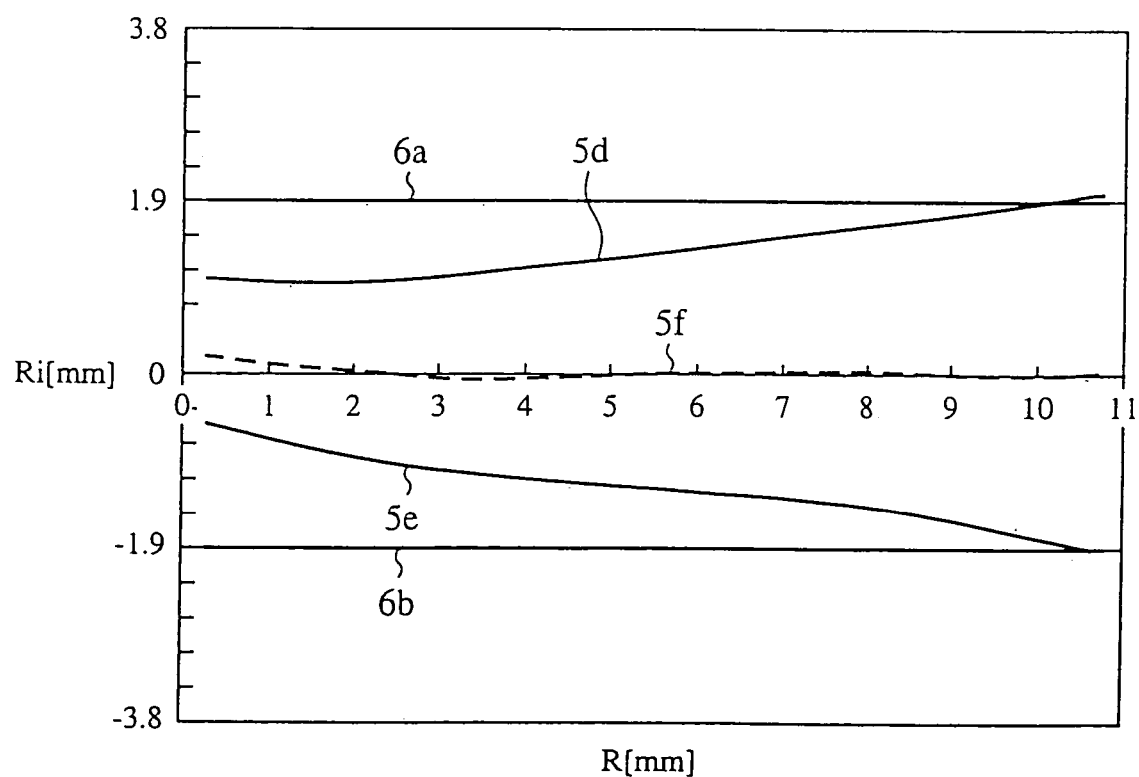
FIG. 16 is a diagram showing a relationship between the outgoing point on the outgoing plane of the lamp front lens and the incident position of the incident plane of the rod integrator.

In order to recognize the effect of the second embodiment, like the case shown in FIG. 13 of the first embodiment, the light receiving state is analyzed when the lamp 1' is applied to the rod integrator 3 (not shown). FIG. 16 shows the results of this analysis.

Figure 7:
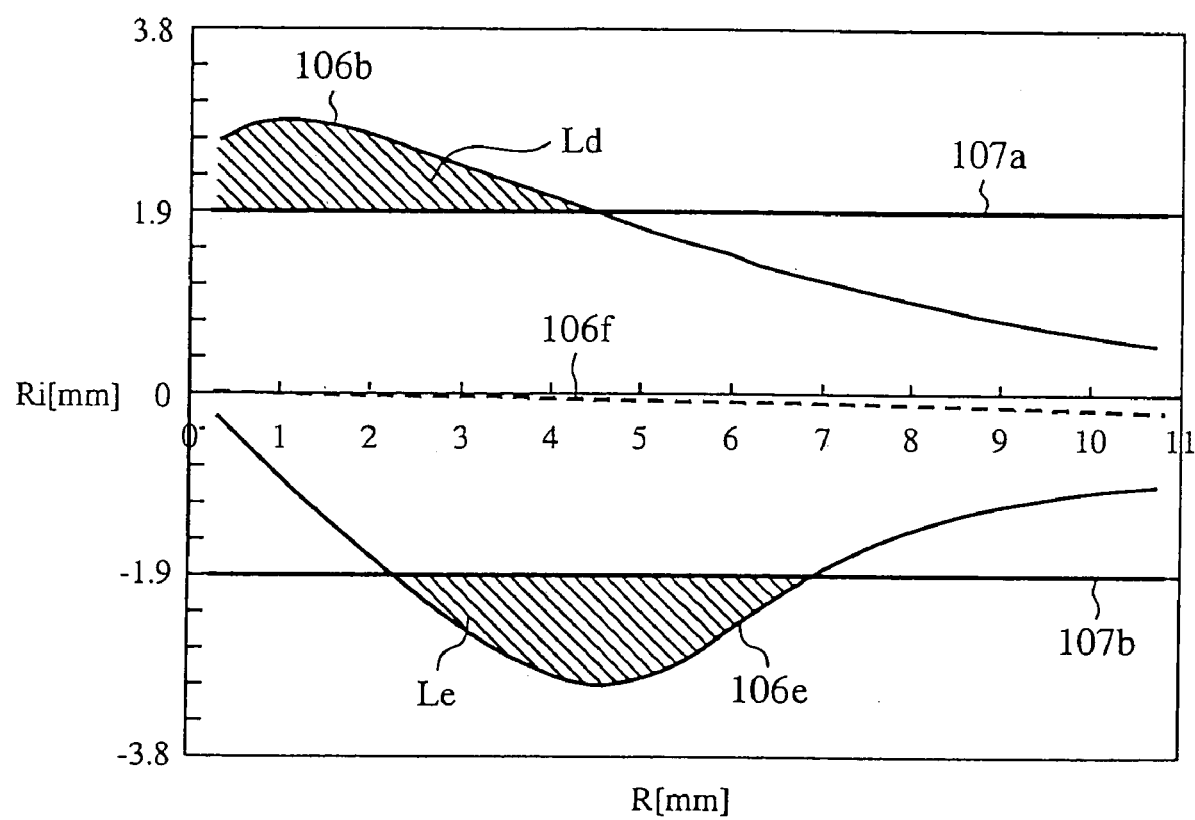
FIG. 7 is a diagram showing the relationship between an outgoing light position of a lamp front glass and a light incident position on the incident plane thereof.

FIG. 16 is a diagram showing the relationship between the outgoing position R on the outgoing plane of the lamp front lens 1c' and the incident position Ri on the incident plane 3a of the rod integrator 3, which is compared with the case of the first embodiment shown in FIG. 13 and the conventional case shown in FIG. 7.

Like the case of FIG. 13, in the case shown in FIG. 16 each light 5d, 5e, and 5f emitted from the front points Pd and Pe, and the center point Pf of the illuminant 1a is analyzed.

When the case shown in FIG. 16 is compared with the case shown in FIG. 13, the incident position R1 of the lights 5d and 5e at the outgoing position R≦approximately 8 mm becomes small, and instead, the incident position Ri of the lights 5d and 5e at the outgoing position R≧approximately 8 mm becomes large. This means it is so designed that the distribution of the light on the outgoing plane of the lamp front lens 1c' in the area close to the optical axis Z becomes low or sparse by the deformed lamp reflector 1b', and the light distribution in the area apart from the optical axis Z becomes high.

Because the light flux close to the optical axis Z is output with a small divergent angle through the outgoing plane of the lamp front lens 1c', the lights 5d and 5e of the outgoing position R≦approximately 8 mm can be condensed with a smaller image to the condensing position (Ri=0 mm) on the optical axis Z, and those lights 5d and 5e are input into the boundaries 6a and 6b with a smaller incident position Ri.

On the contrary, the light flux apart from the optical axis Z is output with a larger divergent angle through the outgoing plane of the lamp front lens 1c', the lights 5d and 5e of the outgoing position R≧approximately 8 mm are condensed as a larger image to the condensing position (Ri=0 mm) on the optical axis Z, and the value of the incident position Ri becomes large, and the lights of the outgoing position R≧approximately 10 mm are not in the boundaries 6a and 6b.

As understood with the explanation of the case shown in FIG. 8 previously described in "Description of the Related Art" section, the area of the outgoing position R≦approximately 8 mm corresponds to the volume zone V of the illuminant 1a, in particular, the area includes lights of the high luminous intensity. For example, the lights of a high luminous intensity can be easily input into the incident plane 3a by performing to diaphragm the image of the light on the condensing position corresponding to the volume zone V, represented by the lights 5d and 5e output from the outgoing position R≦approximately 8 mm.

By this configuration of the lamp 1' of the second embodiment, for example, even if a misalignment occurs between the lamp 1' and the rod integrator 3 during the assembling work or replacing work, or the arc position of the illuminant 1a is shifted in the time proceeds, it is possible to suppress the decreasing of the efficiency of the light input at the incident plane 3a because the lights in the volume zone V can be easily input into the incident plane 3a.

As the compensation for the decreasing of the light image in the volume zone V, the light image of the lights 5d and 5e of the outgoing position R≧approximately 8 mm at the condensing position becomes large when compared with the case of the first embodiment. In particular, the light of the outgoing position R≧approximately 10 mm is out from the boundaries 6a and 6b. However, as can be understood by the case shown in FIG. 8, because the luminous intensity of the lights of the outgoing position R≧approximately 8 mm is relatively low and the luminous intensity of the lights at the outgoing position R≧approximately 10 mm can be neglected, this does not exert serious influence for the light drop.

As can be understood with the explanation described above, the distribution of the lights on the outgoing plane of lamp front lens 1c' is not limited by the case shown in FIG. 15. For example, it is possible that the distribution of the lights in the area close to the optical axis Z is further lower when compared with the case shown in FIG. 15, and the distribution of the light in the area apart from the optical axis Z is further higher when compared with the case shown in FIG. 15, or it is also possible that the distribution of the lights is changed from high, low, high, . . . in order according to the distance measured from the optical axis Z.

That is, the shape of the aspherical reflector surface of the deformed lamp reflector 1b' is so designed by weighting the distribution of the lights at the outgoing plane of the lamp front lens 1c' so that the divergent angle of the light flux corresponding to the volume zone V, for example, is further suppressed. The shape of the aspherical lens surface of the lamp front lens 1c' can be determined by the manner of the first embodiment shown in FIG. 14 according to the shape of the aspherical reflector surface of the deformed lamp reflector 1b' which is determined.

Third Embodiment

The third embodiment improves the efficiency of the receiving of light at the incident plane of the rod integrator by a manner which is different from the manners of the first and second embodiments.

Figure 18A:
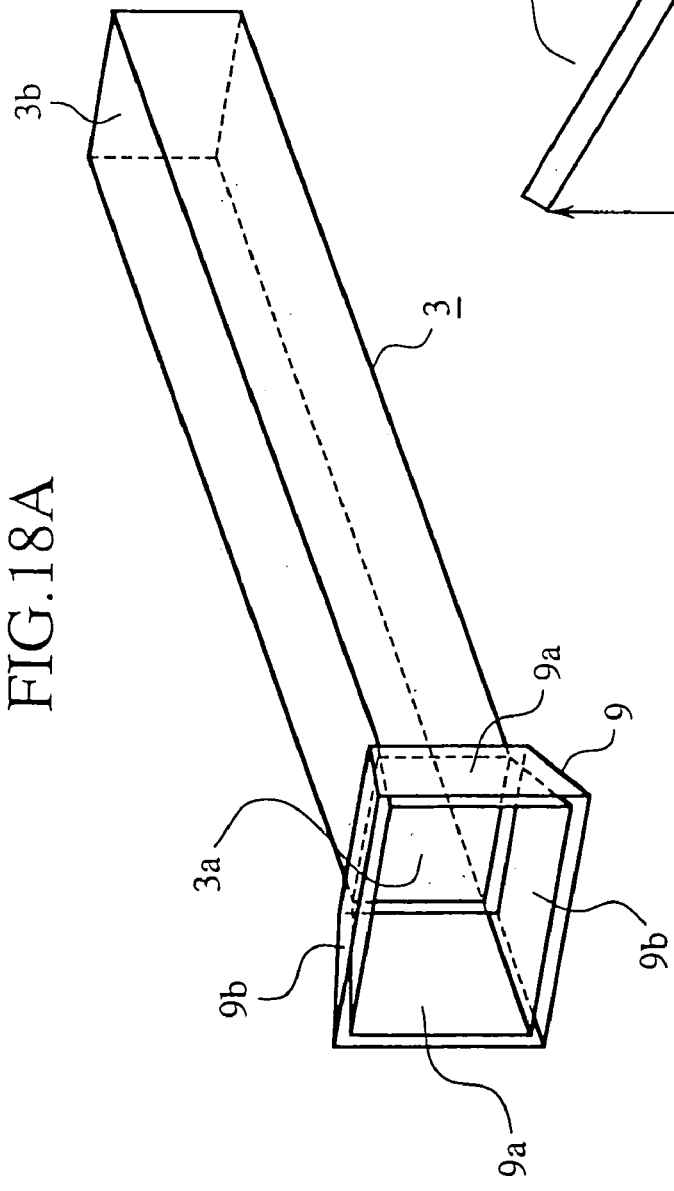
FIGS. 18A and 18B are diagrams showing a configuration of the rod integrator applied to the condensing optical system shown in FIG. 17.
Figure 18B:
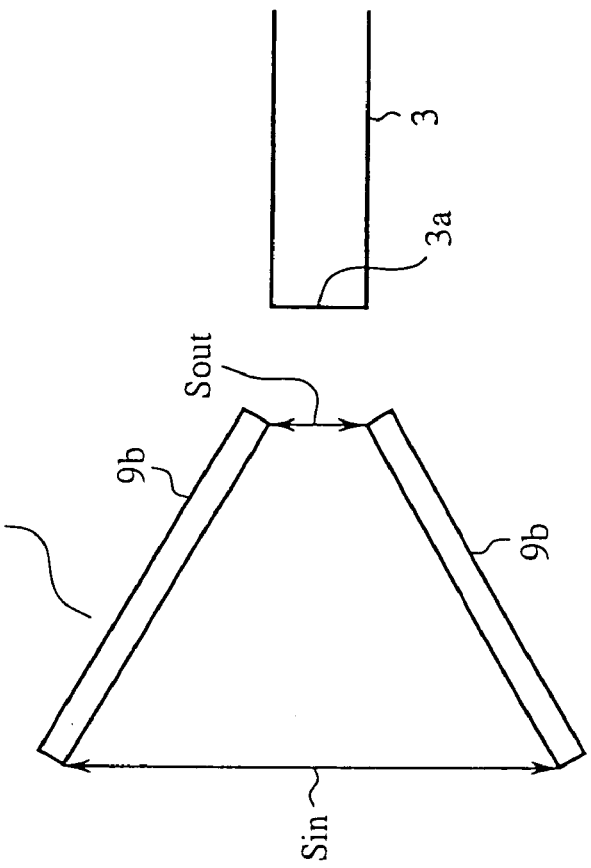

FIG. 17 is a diagram showing the configuration of the condensing optical system according to the third embodiment of the present invention. FIG. 18A and FIG. 18B are diagrams, each of which shows the configuration of the rod integrator shown in FIG. 17. In FIG. 17, FIG. 18A and FIG. 18B, the same components of the case shown in FIG. 9 are referred to with the same reference numbers and characters.

In FIG. 17, FIG. 18A, and FIG. 18B reference number 9 designates a duct-shaped mirror. The duct-shaped mirror shown in FIG. 17 is made up of two pairs of planar mirrors 9a and 9b. The trapezoidal-shaped reflecting plane (reflecting mirror) of the planer mirrors 9a and 9b is directed toward the optical axis Z of the rod integrator 3. The duct-shaped mirror 9 is so formed that it becomes a quardrangular pyramid having four reflecting planes enclosing the optical axis Z.

As shown in FIG. 18B, the upper plane Sout of the quardrangular pyramid of the duct-shaped mirror 9 has the area which is equal to the incident plane 3a of the rod integrator 3 and is fined to the incident plane 3a. The lights from the lamp 1 are input through the lower plane Sin of the quardrangular pyramid, which is larger in area than the upper plane Sout. The lights input in the duct-shaped mirror 9 are output through the upper plane of the quardrangular pyramid. That is, the lower plane Sin and the upper plane Sout of the quardrangular pyramid are the incident aperture and output aperture of the duct-shaped mirror 9, respectively.

FIGS. 19A and 19B are diagrams to explain the effects of the condensing optical system of the third embodiment of the present invention. FIGS. 19A and 19B show the incident state of the light fluxes 10a, 10b, and 10c from the lamp 1 to the incident plane 3a of the rod integrator 3.

FIG. 19A shows the state where there is no duct-shaped mirror 9 and FIG. 19B shows the state using the duct-shaped mirror 9. In FIG. 19A and FIG. 19B, the same or corresponding components of the case shown in FIG. 9 are referred to with the same reference numbers and characters. In the case shown in FIG. 19A, the light flux 10a designated by the alternate long and short dash line is input in the incident plane 3a, but the light flux 10b designated by the solid line and the light flux 10c designated by the dotted line are not input into the incident plane 3a. Those light fluxes 10b and 10c become a leaking loss.

On the contrary, in the case shown in FIG. 19B using the duct-shaped mirror 9, the light fluxes 10b and 10c are input into the duct-shaped mirror 9 through the incident aperture plane Sin having a larger area, and then reflected one time by the reflecting planes of the two pairs of the planer mirrors 9a and 9b of the duct-shaped mirror 9, and finally output to the incident plane 3a of the rod integrator 3 through the output aperture Sout having a smaller area.

Thus, because the duct-shaped mirror 9 is mounted to the incident plane 3a of the rod integrator 3, the light fluxes 10b and 10c can be input into the incident plane 3a in addition to the light flux 7a which is directly input into the incident plane 3a. This can increase the efficiency of the receiving of light.

Further, because the combination of the duct-shaped mirror 9 and the rod integrator 3 becomes equivalent to the enlargement of the area of the incident plane 3a to the area of the incident aperture, it is possible to allow a some error in adjustment between the lamp 1 and the rod integrator 3, and also a certain amount of shift of the optical axis Z of the condensing optical system caused by outer vibration and force.

The shape of the duct-shaped mirror 9 of the third embodiment is not limited by the shape of the quadrangular pyramid shown in FIG. 17 to FIGS. 19A and 19B. Upon the mounting of the duct-shaped mirror 9 into the incident plane having a rectangle shape of the rod integrator 3, in particular, the adaptation of the shape of the quadrangular pyramid (that is, the incident aperture Sin and the output aperture Sout have a rectangle shape) to the duct-shaped mirror 9 can achieve the easy manufacturing of the condensing optical system having the rod integrator 3 of the third embodiment. That is, the output aperture Sout is formed so that it has the same shape and area of the duct-shaped mirror 9 of the rod integrator 3, and the entire of the inside surface (faced to the optical axis Z) of the duct-shaped mirror 9 becomes the reflecting mirror faced to the optical axis Z. It is sufficient to determine the inclined angle of the inside surface to the optical axis Z so that the light fluxes 10b and 10c are reflected one time at the inside surface and transmitted to the output aperture.

The length and the angle of the duct-shaped mirror 9 depend on the brilliance distribution of the light and the distribution of the light near the incident plane of the rod integrator 3. Accordingly, the length and the angle of the duct-shaped mirror 9 are optimized so that the it has the maximum receiving efficiency of light in the rod integrator 3.

In the above explanation, the rod integrator 3 having the duct-shaped mirror 9 is adopted to the lamp 1 of the first and second embodiments. The present invention is not limited by this configuration, for example, it is possible to adopt it to the conventional lamp 101. This case can obtain the same effect of the third embodiment. Furthermore, it is possible to adopt the duct-shaped mirror 9 into the case where the condensed light flux from a lamp using a parabolic mirror and condenser lenses is input into the rod integrator 3. This case can also obtain the same effect of the third embodiment.

As described above, according to the third embodiment, the condensing optical system has the following configuration. The output aperture Sout having the same area of the incident plane 3a of the rod integrator 3 is fixed to this incident plane 3a. The input aperture Sin having a greater area of the output aperture Sout receives the light fluxes 10a, 10b, and 10c. The duct-shaped mirror 9 is made up of two pairs of the plane mirrors 9a and 9b whose reflecting planes enclose the optical axis Z of the rod integrator 3. At least a part of the light fluxes 10b and 10c other than the light flux 10a which is directly input into the incident plane 3a is reflected one time by the plane mirrors 9a and 9b and output the reflected one. The third embodiment has the effect to increase the efficiency of the receiving of light at the incident plane 3a and to reduce the leaking loss because at least a part of the light fluxes 10b and 10c, which cause the leaking loss, can be input into the incident plane 3a. Further the third embodiment has the effect to easily manufacture the condensing optical system.

Fourth Embodiment

The fourth embodiment will show an image display device using a DMD (Digital Micro mirror Device) chip.

Figure 20:
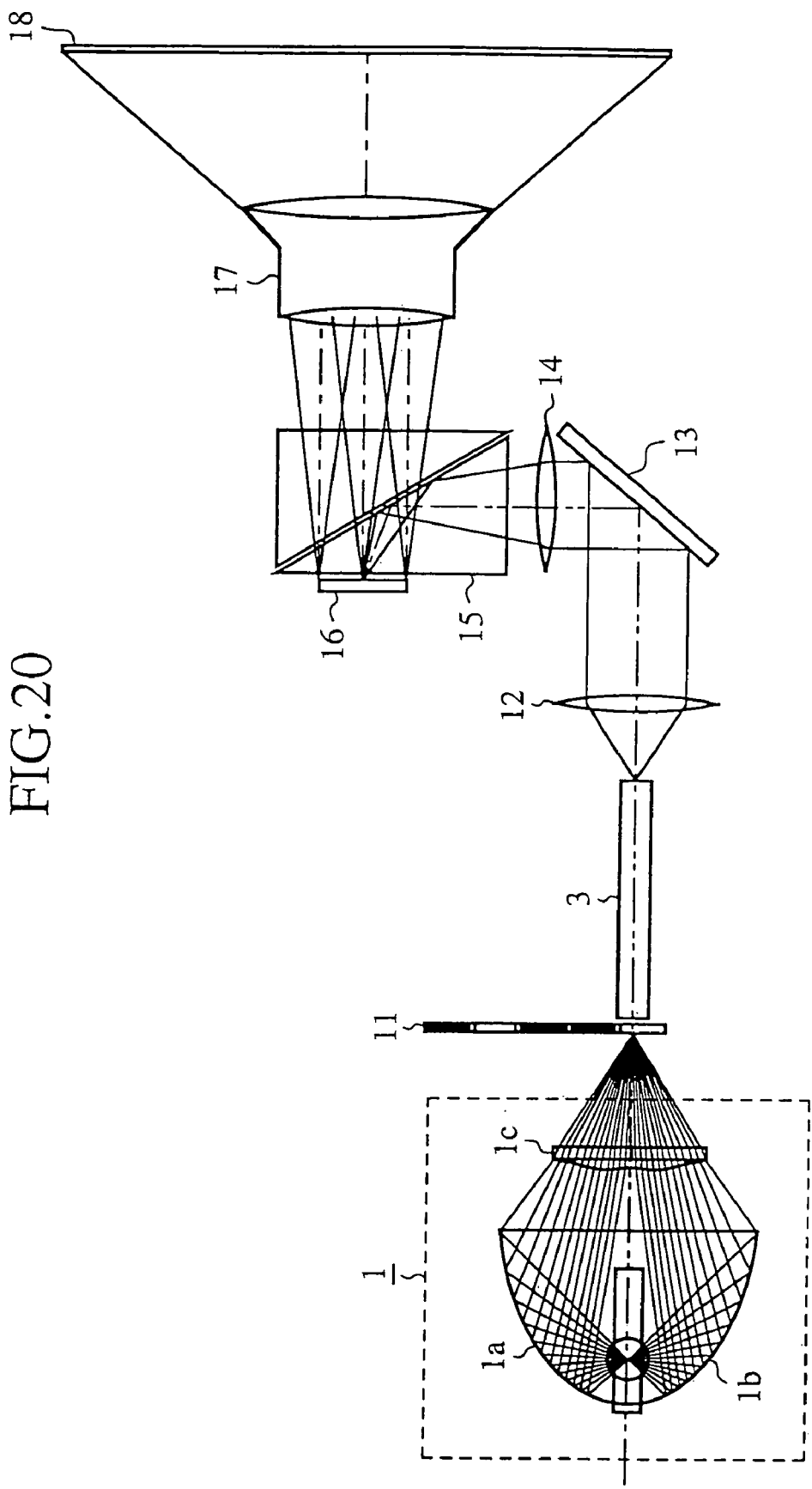
FIG. 20 is a diagram showing an example of a configuration of an image display device according to the fourth embodiment of the present invention.

FIG. 20 is a diagram showing an example of a configuration of the image display device according to the fourth embodiment of the present invention. In FIG. 20, the same components in the configuration shown in FIG. 9 are referred to with the same reference numbers and characters.

In FIG. 20, reference number 11 designates a color wheel to separate a light transmitted from the condensing optical system of each embodiment into three primary colors. Reference number 12 denotes a relay lens (relay optical system) for relaying the light from the rod integrators 3, 13 indicates a reflected mirror (relay optical system) for reflecting the light path, and 14 designates a field lens (relay optical system) for aligning the direction of the main optical light at each point in the incident light flux.

The color wheel 11 is placed front the incident plane 3a or after the outgoing plane 3c of the rod integrator 3.

Reference number 15 indicates a TIR prism, 16 denotes a DMD chip (optical modulation element or optical modulation means of a reflection type), 17 designates a projecting lens (projecting optical system) for focusing the modulated light in intensity from the DMD chip 16, 18 denotes a screen for receiving the light focused by the projection lens 17, on which the received image is displayed.

The TIR prism 15 performs the total reflection only for the incident light flux to the DMD chip 16 in order to prevent the occurrence of the vignette of the incident light flux at the incident section of the projecting lens 17. The TIR prism 17 also performs to pass the outgoing light flux from the DMD chip 16 into the projecting lens 17 without any reflection. That is, the TIR prism 15 has the function to separate the projecting optical system in configuration from the condensing optical system and the relay optical system.

Next, a description will now be given of the operation of the image display device of the fourth embodiment.

The lamp front lens 1c receives and condense the outgoing light from the lamp 1 into its lens focus. The color wheel 11 selects only the designated color in the condensed light. The selected one is input into the incident plane 3a of the rod integrator 3. The light having an approximately uniform distribution intensity with F1 value=1 is output from the outgoing plane 3a of the rod integrator 3, and then relayed by the relay optical system comprising the relay lens 12, the reflecting mirror 13, and the field lens 14, and input into the TIR prism 15. The incident light to the TIR prism 15 is reflected by the inside of the TIR prism 15 and irradiated into the DMD chip 16.

The DMD chip 16 gives image information to the light flux based on digital image information and outputs it as the intensity modulated light flux (as image information light). The intensity modulated light flux having the image information is transmitted through the TIR prism 15 again, and projected on the screen 18 through the projection lens 17.

Since the condensing optical system of each embodiment is used as a light source in the image display device shown in FIG. 20, it is possible to improve the brightness of the image to be projected on the screen 18 when compared with the conventional image display device. The result of analysis indicates that it is possible to increase the brightness of the image approximately 1.25 times when compared with the conventional one. This can provide a greatly large improved effect. In addition, because it is possible to replace only the conventional lamp 101 with the lamp 1 of the present invention and to use the components in the conventional one other than the lamp 101, it is possible to improve the brightness with relatively little efforts.

As described above, the image display device according to the fourth embodiment is made up of the condensing optical system, at least one color wheel 11 for separating the light into three primary colors, the relay optical system, the optical modulation element for giving the image information to the light from the relay optical system, the projecting lens 17 for projecting the light with the image information given by the optical modulation element, and the screen 18 for receiving the light with the image information and for displaying this light. The condensing optical system is made up of the lamp 1 and the rod integrator 3. The color wheel 11 is placed front the incident plane 3a or after the outgoing plane 3c of the rod integrator 3. The relay optical system is made up of the relay lens 12, the reflected mirror 13, and the field lens 14. The optical modulation element is made up of the TIR prism 15 and the DMD chip 16.

The image display device of the fourth embodiment can reduce the leaking loss generated in the incident plane 3a of the rod integrator 3 and can obtain the effect to improve the brilliance of the image to be displayed on the screen 18.

The adaptation of the condensing optical system of the present invention is not limited by the above configuration where it is adopted into the image display device using the TIR prism and the DMD. For example, it is possible to apply the condensing optical system to the image display device using a liquid crystal panel to control the image information light by polarization of light or light scattering and the image display device using self-luminescence. These cases can obtain the same effect of the fourth embodiment.

Although each embodiment described above uses the rod integrator 3, the present invention is not limited by this configuration. For example, it is also possible to use an integrator of a hollow structure (integrator optical system). This case can obtain the same effect.

As set forth, in the lamp according to the present invention, the ellipsoidal of revolution of the lamp reflector is formed by deforming with a aspherical reflection surface which is in symmetry of rotation to the optical axis. At least one of the incident plane and the outgoing plane of the lamp front glass is so formed by deforming with a aspherical lens surface which is in symmetry of rotation to the optical axis. A different power for each radiation direction is applied to each light flux from the illuminant by the aspherical reflection surface and the aspherical lens surface apply in order to suppress a distribution of a divergent angle at the outgoing plane of the lamp front lens. When compared with the conventional one, the present invention has therefore the effect to condense the light flux of a suppressed divergent angle into the condensing position, and to more reduce the illuminant image of the illuminant section having a finite size, and to condense it into the condensing position.

Further, according to the present invention, the outgoing light flux is so output that the divergent angle thereof at an optional point on the outgoing plane of the lamp front lens becomes constant. When compared with the conventional one, the present invention has therefore the effect to condense the light flux whose divergent angle is suppressed with a constant value into the condensing point, and to more reduce the illuminant image of the illuminant section having a finite size, and to condense it into the condensing position.

According to the present invention, a condensing optical system has the lamp of the present invention and the integrator optical system. The integrator optical system receives through its incident plane a light flux output from the lamp which is condensed on a condensing point of the aspherical lens surface of the lamp. The integrator optical system then reflects the light flux by its side surface and outputs the light flux through its outgoing plane. When compared with the conventional one, the present invention has therefore the effect to suppress the expansion of the illuminant image of the illuminant section at the condensing position, and also to reduce a leaking loss of the lights at the incident plane of the integrator optical system.

Furthermore, according to the present invention, in the integrator optical system, a shape of the integrator optical system is a square pole having incident plane and outgoing plane of a rectangle-shaped. The integrator optical system has an outgoing aperture having a rectangle-shaped area which is equal to the area of the incident plane of the integrator optical system, and the outgoing aperture is fixed to the incident plane of the integrated optical system. The incident aperture of the duct-shaped mirror has an rectangle-shaped area which is larger than the area of the outgoing aperture, through which the light flux emitted from the lamp is input. The four planar mirrors whose reflecting surfaces enclose the optical axis of the integrator optical system. At least a part of the incident light other than the incident light which is directly input into the incident plane of the planar mirrors is reflected by the reflecting surface of the planar mirrors and output through the outgoing aperture. The present invention has the effect to input at least a part of the light flux, which becomes a leaking loss of light, into the incident plane in addition to the light flux which is directly input into the incident plane. This can increase the efficiency to receive lights at the incident plane, reduce the leaking loss, and also easily manufacture the condensing optical system.

Still further, according to the present invention, the image display device has the condensing optical system of the present invention, the relay optical system for relaying lights output from the condensing optical system, the optical modulation element for giving image information the lights output from the relay optical system, and for outputting the lights with the image information, the projecting optical system for projecting the lights with the image information output from the optical modulation element, and the screen for receiving the lights projected by the projecting optical system and for displaying the image based on the image information. Accordingly, the present invention has the effect to reduce the leaking loss occurred at the incident plane of the integrator optical system. When compared with the conventional one, the present invention has the effect to improve the brightness of the illuminant image to be displayed on the screen.

Moreover, according to the present invention, in the image display device, the optical modulation element is made up of a plurality of small-sized mirrors and acts as a reflecting optical modulation means for outputting the lights with the image information to the projecting optical system. When compared with the conventional one, the present invention has therefore the effect to improve the brightness of the illuminant image to be displayed on the screen.

According to the present invention, in the image display device, the optical modulation element is made up of a liquid crystal panel for controlling the lights with the image information by polarization or light scattering. When compared with the conventional one, the present invention has therefore the effect to improve the brightness of the illuminant image to be displayed on the screen.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A lamp comprising:
an illuminant section having an illuminant for radiating light having a size determined by an arc length and direction of the arc length along an optical axis of the lamp, the illuminant having a center point;
a lamp reflector for condensing light flux emitted from a center point of the illuminant, the reflector being a surface of revolution about the optical axis, and the center point of the illuminant being located at a focus of the lamp reflector and on the optical axis; and
a lamp front glass having a substantially planar incident surface and a substantially planar outgoing surface, for receiving the light flux reflected by the lamp reflector through the incident surface and outputting the light flux through the outgoing surface, wherein
the surface of revolution of the lamp reflector is a deformed aspherical reflection surface,
a deformed aspherical lens having a substantially planar rear surface and a deformed aspherical lens front surface which has a rotational symmetry about the optical axis and largest thickness, measured parallel to the optical axis, at a position spaced from the optical axis and spaced from a peripheral edge of the deformed aspherical lens front surface, the substantially planar rear surface of the deformed aspherical lens being disposed on at least one of the incident surface and the outgoing surface of the lamp front glass,
after the light flux radiated by the illuminant is reflected by the lamp reflector, within an effective light receiving area of the lamp reflector, divergence angles of light rays proximate the optical axis on the outgoing surface of the lamp front glass are smaller than divergence angles of the light rays passing through the outgoing surface of the lamp front glass and remote from the optical axis due to shapes of the aspherical reflection surface and the deformed aspherical lens, and
a different power for each radiation direction is applied by the aspherical reflection surface and the deformed aspherical lens, suppressing distribution of divergence angles of the light flux at the outgoing surface of the lamp front glass.

2. The lamp according to claim 1, wherein the divergence angles of the light flux at a point on the outgoing surface of the lamp front glass become constant.

3. A condensing optical system comprising:
the lamp according to claim 1; and
an integrator optical system for receiving through an incident plane a light flux output from the lamp, which is condensed on a condensing point of the aspherical lens, and for reflecting the light flux at a side surface, and for outputting the light flux through an outgoing plane.

4. The condensing optical system according to claim 3, wherein
the integrator optical system has a square pole shape having an incident plane and an outgoing plane with a rectangular shape, and
the integrator optical system comprises
an outgoing aperture having a rectangular area equal in area to the area of the incident surface of the integrator optical system, wherein the outgoing aperture is fixed to the incident plane of the integrated optical system;
a duct-shaped mirror having an incident aperture with a rectangular area which is larger than the area of the outgoing aperture, through which the light flux emitted from the lamp is input; and
four planar mirrors having reflecting surfaces that enclose the optical axis of the integrator optical system, wherein at least a part of the incident light, other than the incident light which is directly input into the planar mirrors, is reflected by the reflecting surfaces of the planar mirrors and output through the outgoing aperture.

5. An image display device comprising:
the condensing optical system according to claim 3;
a relay optical system for relaying light output from the condensing optical system;
an optical modulation element for adding image information to the light output from the relay optical system, and for outputting the light with the image information;
a projecting optical system for projecting the light with the image information output from the optical modulation element; and
a screen for receiving the light projected by the projecting optical system and for displaying an image based on the image information.

6. The image display device according to claim 5, wherein the optical modulation element includes a plurality of mirrors for outputting the light with the image information to the projecting optical system.

7. The image display device according to claim 5, wherein the optical modulation element includes a liquid crystal panel for controlling the light with the image information by polarization or light scattering.

8. The lamp according to claim 1, wherein
the aspherical reflection surface includes a plurality of infinitesimal mirrors,
each of the plurality of infinitesimal mirrors reflects a respective light ray corresponding to a respective intersection with a plane containing the lamp front glass, the light rays being obtained by dividing an angular range of the light produced by the illuminant into N uniform angles, where N is a natural number, in a direction from a condensing point on the optical axis, where the light rays intersect, toward the lamp front glass, and
the infinitesimal mirrors are located at respective intersections between the corresponding light rays and respective lines extending from a reflection surface of an adjacent infinitesimal mirror so that each infinitesimal mirror reflects the corresponding light ray to the respective intersection.

* * * * *